(12) United States Patent
Jung et al.

(10) Patent No.: US 11,765,245 B2
(45) Date of Patent: Sep. 19, 2023

(54) ELECTRONIC DEVICE AND METHOD FOR PERFORMING SERVICE DISCOVERY IN ELECTRONIC DEVICE

(71) Applicant: Samsung Electronics Co., Ltd., Suwon-si (KR)

(72) Inventors: Buseop Jung, Suwon-si (KR); Hyejung Bang, Suwon-si (KR); Namju Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/677,510

(22) Filed: Feb. 22, 2022

(65) Prior Publication Data

US 2022/0182453 A1  Jun. 9, 2022

Related U.S. Application Data

(63) Continuation of application No. PCT/KR2020/012826, filed on Sep. 23, 2020.

(30) Foreign Application Priority Data

Oct. 2, 2019  (KR) .......................... 10-2019-0122108

(51) Int. Cl.
*H04L 67/51* (2022.01)
*H04L 67/566* (2022.01)
*H04L 67/104* (2022.01)

(52) U.S. Cl.
CPC .......... *H04L 67/51* (2022.05); *H04L 67/1048* (2013.01); *H04L 67/566* (2022.05)

(58) Field of Classification Search
CPC ... H04L 67/51; H04L 67/1048; H04L 67/566; H04L 69/18; H04W 4/80; H04W 84/18; H04W 88/06; H04W 4/08; H04W 8/005
See application file for complete search history.

(56) References Cited

U.S. PATENT DOCUMENTS 9,801,039 B2  10/2017  Oren et al.
2014/0211659 A1  7/2014  Abraham et al.
(Continued)

FOREIGN PATENT DOCUMENTS

KR  10-2015-0111994 A  10/2015

OTHER PUBLICATIONS

European Search Report dated Sep. 15, 2022, issued in European Application No. 20871811.4.

*Primary Examiner* — Benjamin M Thieu
(74) *Attorney, Agent, or Firm* — Jefferson IP Law, LLP

(57) ABSTRACT

An electronic device and a service discovery method in the electronic device are provided. The device includes at least one communication module, a processor operatively connected with the at least one communication module, and a memory operatively connected with the at least one communication module and the processor. The memory may store instructions configured to, when executed, enable the processor to configure a neighbor awareness network (NAN) cluster communicating with a plurality of external electronic devices based on a first communication protocol, through the at least one communication module, identify a service target device among the plurality of external electronic devices, while operating with the plurality of external electronic devices based on the first communication, and allow at least one external electronic device, except for the service target device among the plurality of external electronic devices, to deactivate at least one function related to the first communication protocol.

20 Claims, 19 Drawing Sheets

(56) References Cited

U.S. PATENT DOCUMENTS

| | | |
|---|---|---|
| 2015/0172391 A1 | 6/2015 | Kasslin et al. |
| 2015/0172902 A1 | 6/2015 | Kasslin et al. |
| 2016/0150392 A1* | 5/2016 | Jung .................. H04W 8/005 455/450 |
| 2016/0150537 A1* | 5/2016 | Jung .................. H04W 8/005 455/452.1 |
| 2016/0205529 A1 | 7/2016 | Oren et al. |
| 2017/0223486 A1 | 8/2017 | Abraham et al. |
| 2017/0289741 A1 | 10/2017 | Huang et al. |
| 2018/0338343 A1 | 11/2018 | Qi et al. |
| 2019/0053141 A1 | 2/2019 | Jung et al. |
| 2019/0069242 A1 | 2/2019 | Park et al. |
| 2019/0132788 A1 | 5/2019 | Qi et al. |
| 2019/0132791 A1 | 5/2019 | Fujimori |
| 2019/0174400 A1 | 6/2019 | Park et al. |
| 2019/0239149 A1 | 8/2019 | Jung et al. |
| 2019/0239259 A1* | 8/2019 | Kunimatsu ........... H04W 8/005 |

\* cited by examiner

ELECTRONIC DEVICE AND METHOD FOR PERFORMING SERVICE DISCOVERY IN ELECTRONIC DEVICE

CROSS-REFERENCE TO RELATED APPLICATION(S)

This application is a continuation application, claiming priority under § 365(c), of an International application No. PCT/KR2020/012826, filed on Sep. 23, 2020, which is based on and claims the benefit of a Korean patent application number 10-2019-0122108, filed on Oct. 2, 2019, in the Korean Intellectual Property Office, the disclosure of which is incorporated by reference herein in its entirety.

BACKGROUND

Various embodiments of the disclosure relate to a method for performing service discovery in neighbor awareness networking (NAN) by triggering a Bluetooth low energy (BLE) function in an electronic device.

Wireless communication systems are being widely deployed to provide various types of communication services, such as voice or data. In general, a wireless communication system is a multiple access system capable of supporting communication with multiple users by sharing available system resources (bandwidth or transmission power). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, or a multi-carrier frequency division multiple access (MC-FDMA) system.

Further, with the recent development of information and communication technology, various wireless communication technologies are being developed. Among them, wireless LAN (WLAN) is technology that enables wireless access to the Internet in home or business or a specific service area, using a portable terminal, such as a personal digital assistant (PDA), a laptop computer, or a portable multimedia player (PMP) based on radio frequency technology. In the Wi-Fi (or Wi-Fi Aware™) standard among radio frequency technologies, a low-power discovery technology called neighbor awareness networking (NAN) is being developed, which is used to develop proximity services.

The above information is presented as background information only to assist with an understanding of the disclosure. No determination has been made, and no assertion is made, as to whether any of the above might be applicable as prior art with regard to the disclosure.

SUMMARY

NAN devices in the NAN cluster are configured to wait in a low-power mode (e.g., BLE scan mode) to optimize standby current consumption. When receiving a BLE transport discovery service (TDS) advertisement (AD) packet having service information while operating in the low-power mode, it may activate a NAN mode to perform NAN service discovery.

As NAN service discovery is performed, the electronic device may discover at least one NAN device and, among the at least one NAN device, a first NAN device may be selected for sharing content by the user. Thereafter, the electronic device may communicate with the first NAN device in the NAN mode.

Among the NAN devices in the NAN cluster, the remaining NAN devices other than the first NAN device are unable to determine whether they communicate with the electronic device after switching from the low-power mode to the NAN mode and thus may not arbitrarily deactivate the NAN mode. When the remaining NAN devices other than the first NAN device operate in the NAN mode, relatively more current may be consumed than when only the low power mode is activated.

According to various embodiments of the disclosure, devices other than the first NAN device among the NAN devices may keep active in the NAN mode.

Aspects of the disclosure are to address at least the above-mentioned problems and/or disadvantages and to provide at least the advantages described below. Accordingly, an aspect of the disclosure is to provide a method for performing service discovery in NAN by triggering a BLE function in an electronic device.

Additional aspects will be set forth in part in the description which follows and, in part, will be apparent from the description, or may be learned by practice of the presented embodiments.

According to various embodiments of the disclosure, an electronic device may comprise at least one communication module, a processor operatively connected with the at least one communication module, and a memory operatively connected with the at least one communication module and the processor. The memory may store instructions configured to, when executed, enable the processor to configure a neighbor awareness network (NAN) cluster communicating with a plurality of external electronic devices based on a first communication protocol, through the at least one communication module, identify a service target device among the plurality of external electronic devices, while operating with the plurality of external electronic devices based on the first communication protocol, in response to a service discovery request, and allow at least one external electronic device, except for the service target device, among the plurality of external electronic devices, to deactivate at least one function related to the first communication protocol, through the at least one communication module based on identifying the service target device.

According to various embodiments of the disclosure, an electronic device may comprise at least one communication module, a processor operatively connected with the at least one communication module, and a memory operatively connected with the at least one communication module and the processor. The memory may store instructions configured to, when executed, enable the processor to compose a NAN cluster communicating with a first electronic device based on a first communication protocol, through the at least one communication module, control the at least one communication module to transmit a service discovery request to the first electronic device, obtain service group information from the first electronic device, based on the transmission of the service discovery request, identify whether the service group information includes information about the electronic device, and control the at least one communication module to deactivate at least one function related to the first communication protocol when it is identified that the service group information does not include the information about the electronic device.

According to various embodiments of the disclosure, a method for performing service discovery in an electronic device may comprise configuring a NAN cluster communicating with a plurality of external electronic devices based on a first communication protocol, identifying a service target device among the plurality of external electronic devices, while operating with the plurality of external electronic devices based on the first communication protocol, in response to a service discovery request, and allowing at least one external electronic device, except for the service target device, among the plurality of external electronic devices, to control to deactivate at least one function related to the first communication protocol based on identifying the service target device.

According to various embodiments of the disclosure, a method for performing service discovery in an electronic device may comprise configuring NAN cluster communicating with a first electronic device based on a first communication protocol, transmitting a service discovery request to the first electronic device, obtaining service group information from the first electronic device, based on the transmission of the service discovery request, identifying whether the service group information includes information about the electronic device, and deactivating at least one function related to the first communication protocol when it is identified that the service group information does not include the information about the electronic device.

According to various embodiments of the disclosure, an electronic device and a service discovery method in the electronic device may transmit information to NAN devices in a NAN cluster when performing low-power-based NAN communication, thus reducing unnecessary power consumption for devices not performing NAN communication when performing service discovery.

According to various embodiments of the disclosure, in an electronic device and a service discovery method in the electronic device, a NAN device activating BLE communication may control deactivation of NAN communication for devices which are not service targets, based on the result of service discovery.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
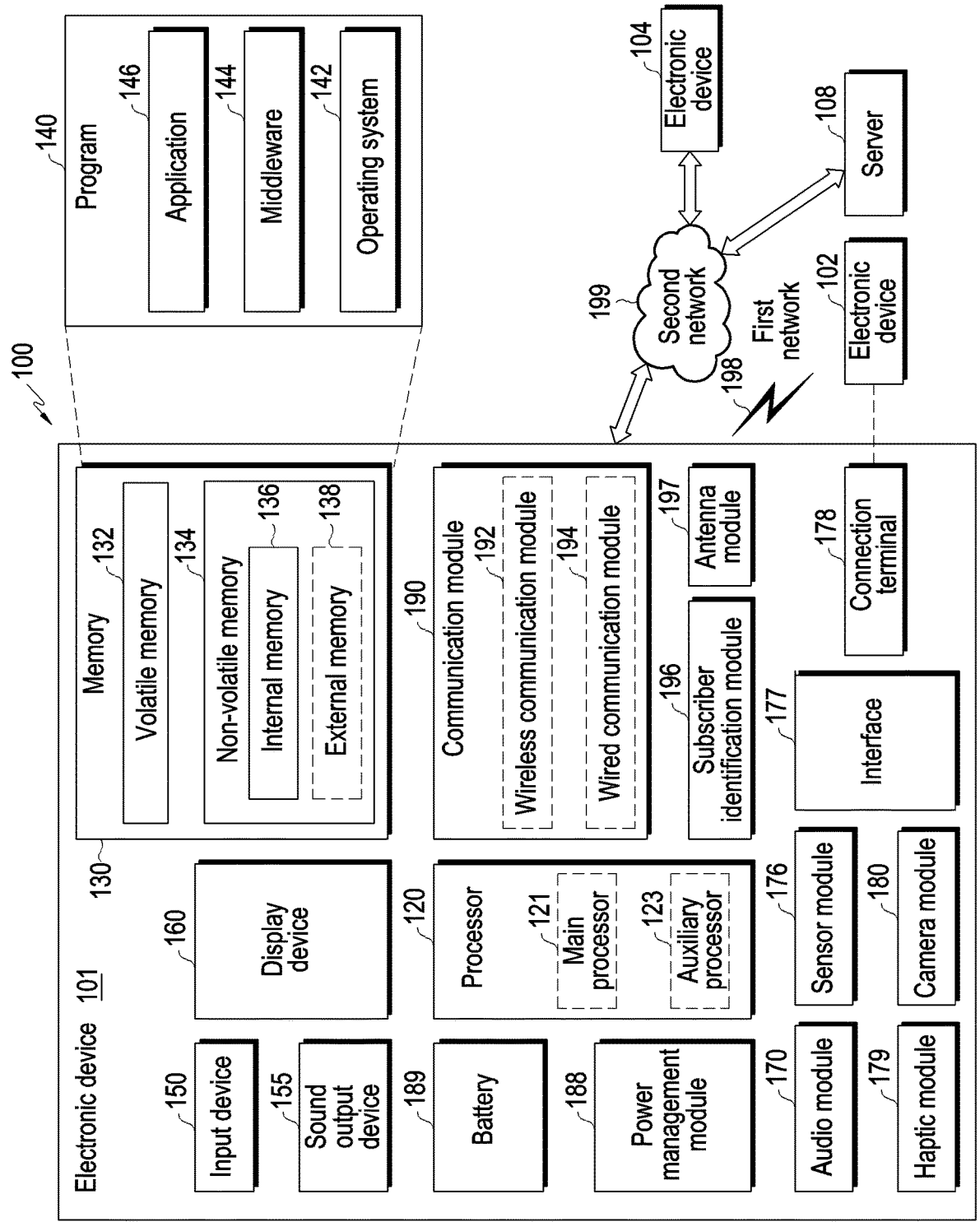
FIG. 1 is a block diagram illustrating an electronic device in a network environment according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A or B" may include all possible combinations of A and B. The terms, such as "first," "second," "first," or "second," may modify the relevant components regardless of order or importance and are used merely to distinguish one component from another, rather than limiting the components. When an (e.g., first) component is referred to as being "connected (functionally or communicatively)" or "connected" to another (e.g., second) component, the component may be connected to the other component directly or via another component (e.g., a third component).

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

For example, examples of the electronic device according to embodiments of the present disclosure may include at least one of a smart phone, a tablet personal computer (PC), a mobile phone, a video phone, an e-book reader, a desktop PC, a laptop computer, a netbook computer, a workstation, a server, a personal digital assistant (PDA), a portable multimedia player (PMP), a moving picture experts group (MPEG-1 or MPEG-2) audio layer 3 (MP3), a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box (e.g., Samsung HomeSync™, Apple television (TV)™, or Google TV™), a gaming console (Xbox™ or PlayStation™), an electronic dictionary, an electronic key, a camcorder, or an electronic picture frame.

According to another embodiment, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs) of financial organizations, point of sales (POS) devices of stores, or Internet of things devices (e.g., a bulb, various sensors, a sprinkler, a fire alarm, a thermostat, a street light, a toaster, fitness equipment, a hot water tank, a heater, or a boiler). According to some embodiments, examples of the electronic device may at least one of part of furniture or building/structure, an electronic board, an electronic signature receiving device, a projector, or various measurement devices (e.g., devices for measuring water, electricity, gas, or electromagnetic waves). According to embodiments of the present invention, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Hereinafter, an electronic device and an electronic device and method for discovering a service according to various embodiments of the disclosure are described with reference to the accompanying drawings. As used herein, the term "user" may denote a human or another device (e.g., an artificial intelligent electronic device) using the electronic device.

FIG. 1 is a block diagram illustrating an electronic device in a network environment according to various embodiments of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
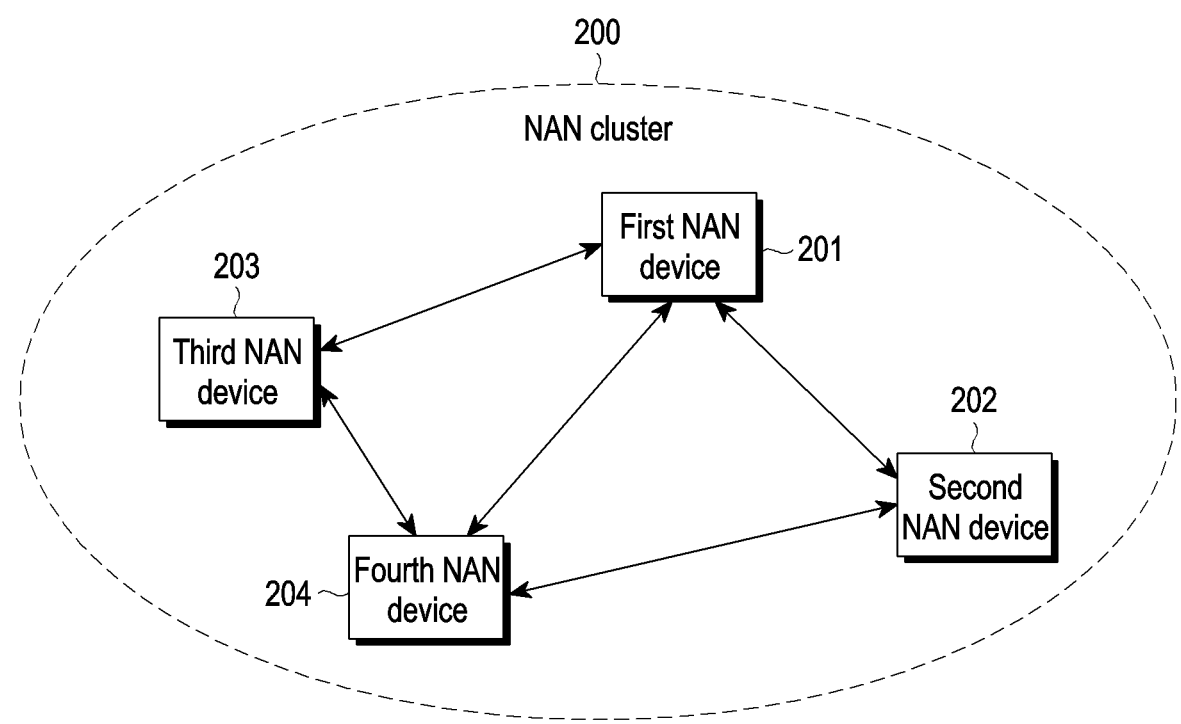
FIG. 2 is a block diagram illustrating an example of a configuration of a NAN cluster according to various embodiments of the disclosure.

FIG. 2 is a block diagram illustrating an example of a configuration of a NAN cluster according to various embodiments of the disclosure.

According to various embodiments of the disclosure, a NAN device (e.g., a first NAN device 201), together with at least one external electronic device (e.g., a second NAN device 202, a third NAN device 203, or a fourth NAN device 204) may compose a NAN cluster 200.

Referring to FIG. 2, NAN devices (e.g., 201, 202, 203 or 204) in the NAN cluster 200 may perform time synchronization for performing a low-power discovery technology in the Wi-Fi standard. The time synchronization is a technology that allows beacons or service discovery frames (SDFs) to be exchanged therebetween in the same discovery window (DW) period. The DW is a time during which NAN devices are in a wake state and, in the DW, much power is consumed. In other periods than the DW, NAN devices may remain in a sleep state and may thus be discovered with low power. Accordingly, even when the discovery state is always on, current consumption may reduce, and advantages may be gained in exchange of information between proximate NAN devices. Further, various application services may be developed.

According to various embodiments of the disclosure, when the NAN cluster 200 is configured, the first NAN device 201, which serves as the master, may perform a passive scan while waiting in a state in which the master role is set. To reduce current consumption generated while performing the passive scan, the first NAN device 201 may operate in a BLE scan mode.

Figure 3A:
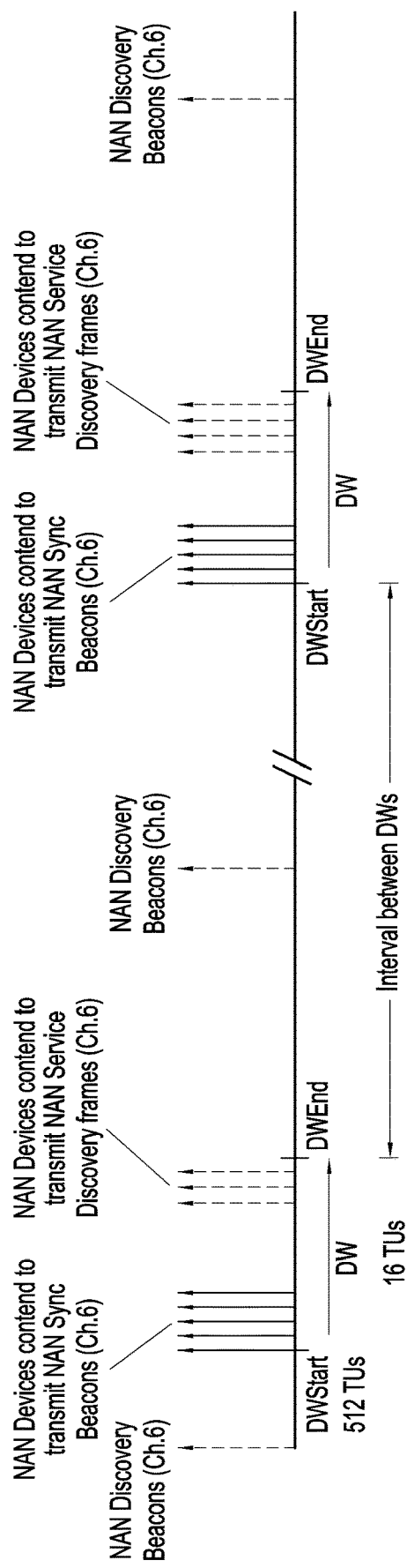
FIGS. 3A and 3B are views illustrating an example of a configuration of a DW according to various embodiments of the disclosure.
Figure 3B:
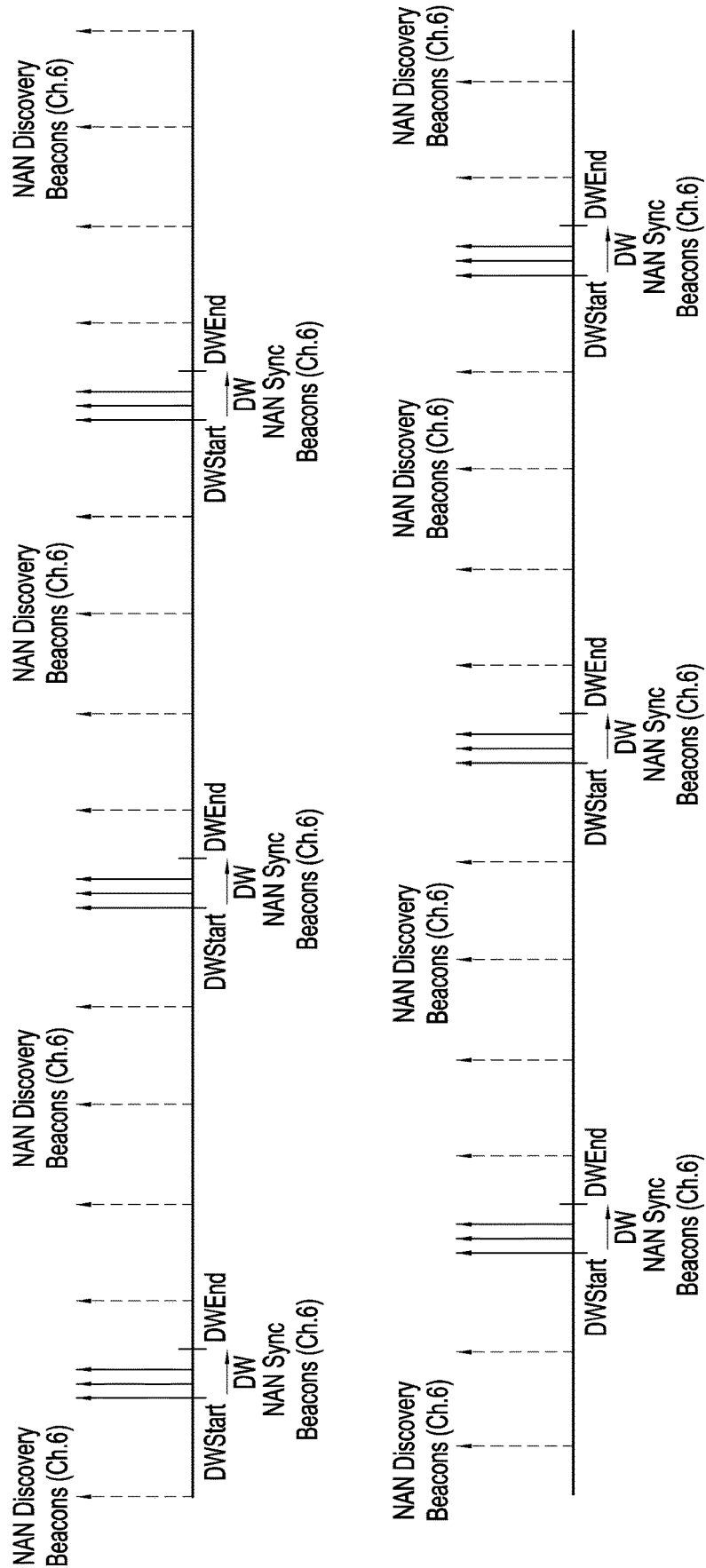

FIGS. 3A and 3B are views illustrating an example of a configuration of a DW according to various embodiments of the disclosure.

According to various embodiments of the disclosure, the time-synchronized NAN devices in the NAN cluster 200 may exchange beacons (e.g., sync beacon) or SDFs within the same DW. The beacon transmitted in the DW may include information for time-synchronizing the NAN cluster, so that the NAN devices receiving the beacon may maintain the time-synchronization.

Referring to FIG. 3A, the NAN cluster 200 may use channel 6 of the 2.4 GHz band as a common channel. For example, the DW may last for 16 time units (TUs), and an interval of 512 TUs may be present between the DWs.

Referring to FIG. 3B, in the NAN cluster 200, channel 6 of the 2.4 GHz band and channel 149 of the 5 GHz band may simultaneously be configured as DWs and used. For example, the channel of the 5 GHz band may vary depending on the channel policy of each area.

The NAN device designated as a master device in the NAN cluster 200 may transmit a discovery beacon in the DW period. Devices not included in the NAN cluster 200 may perform a passive scan on the discovery beacon to identify NAN cluster information or time synchronization information.

According to various embodiments of the disclosure, the NAN devices may set their roles and states depending on a designated condition. For example, the designated condition may include the RSSI or master rank. The role may include a role as a master device or a non-master device, and the state may include a synchronization state or a non-synchronization state.

According to various embodiments of the disclosure, a device having the highest master rank value among the NAN devices may serve as a master device. The master rank may be a combination of master preference, random factor, or NAN interface address. For example, the NAN device having the highest master preference may be set as the master device. If the NAN devices have the same master preference, their role or state may be determined based on the random factor or NAN interface address.

According to various embodiments of the disclosure, if first NAN communication is activated in the electronic device 101, the electronic device 101 may serve as a master and may compose a NAN cluster with designated NAN synchronization information. The electronic device 101 periodically performs a passive scan and, if identifying a device having a higher master preference than the electronic device 101, the role of the electronic device 101 may be switched to a non-master device and switched to synchronization or non-synchronization state.

According to various embodiments of the disclosure, the electronic device 101 may join the cluster of the device having a higher master preference than the electronic device 101 while removing the previously composed NAN cluster.

Figure 4:
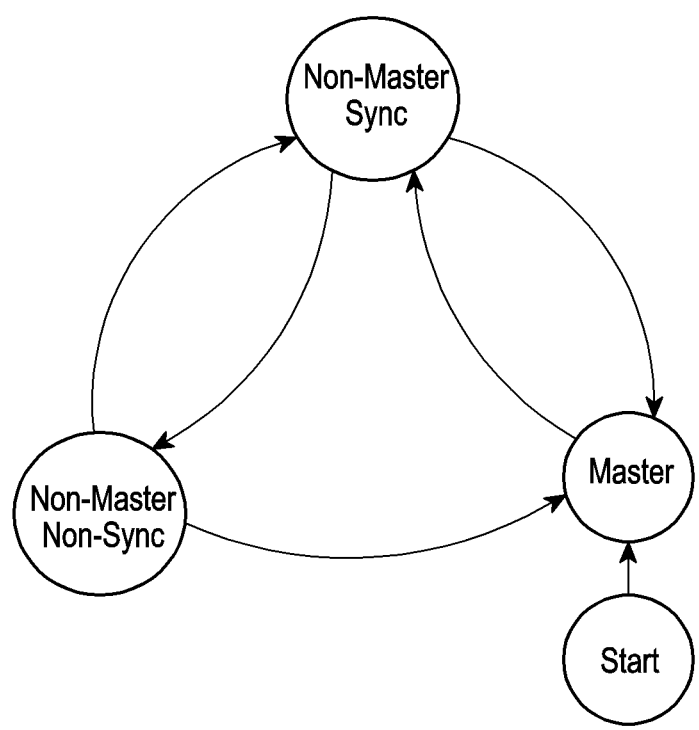
FIG. 4 is a view illustrating an example of a device role and state transition configuration of a NAN cluster according to various embodiments of the disclosure.

FIG. 4 is a view illustrating an example of a device role or state transition configuration of a NAN cluster according to various embodiments of the disclosure.

Referring to FIG. 4, a NAN device (e.g., the first NAN device 201 or the electronic device 500) may change its role or state depending on the master rank. For example, the role may include master or non-master, and the state may include a sync or non-sync state.

According to various embodiments of the disclosure, when the NAN device is switched from a master role to a non-master role, it may be set to the synchronous state (non-master sync) first and, in the DW period, it may switch to the non-synchronized state (non-master non-sync). When the switch occurs, only its role switches to the master role at the end time of the DW, but it may remain in the non-sync state.

According to various embodiments of the disclosure, the role of the master device may be determined depending on the master rank. The master rank may be determined by the master preference, the random factor, or the NAN interface address as shown in Equation 1 below.

$$\text{MasterRank} = \text{MasterPreference} \times 2^{56} + \text{RandomFactor} \times 2^{48} + \text{MAC}[5] \times 2^{40} + \ldots + \text{MAC}[0] \quad \text{Equation 1}$$

According to various embodiments of the disclosure, the master preference value may be fixed for 240 DWs after changed. The random factor value may be fixed value for 120 DWs, and may be changed before at least 240 DWs. The NAN interface address value may be fixed value for at least 240 DWs.

Figure 5:
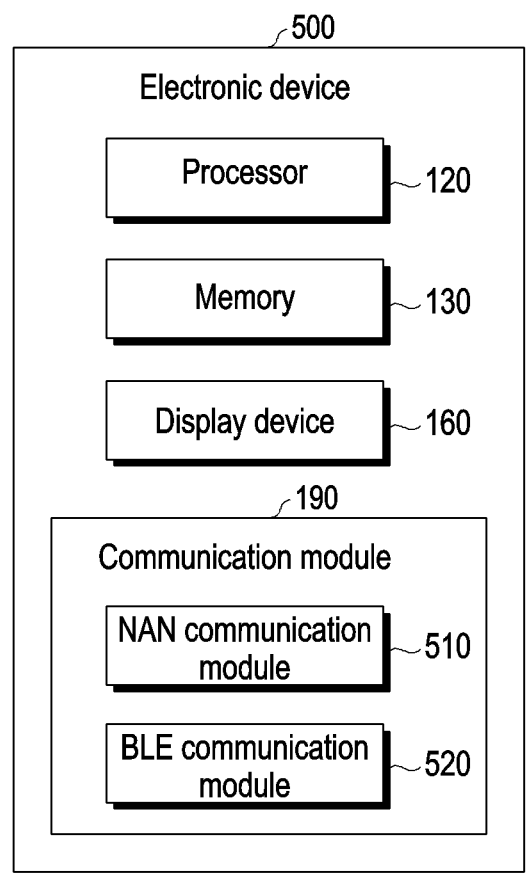
FIG. 5 is a block diagram illustrating an example of a configuration of an electronic device according to various embodiments of the disclosure.

FIG. 5 is a block diagram illustrating an example configuration of an electronic device according to an embodiment of the disclosure.

Referring to FIG. 5, an electronic device 500 (e.g., the first NAN device 201, the second NAN device 202, the third NAN device 203, or the fourth NAN device 204 of FIG. 2) may include at least one of a processor 120, a memory 130, a display device 160, or a communication module 190.

According to various embodiments of the disclosure, the electronic device 500 may identify a service target device among NAN devices in the NAN cluster 200 and may transmit service information related to NAN communication with the service target device to the NAN devices.

According to various embodiments of the disclosure, the processor 120 may control the overall operation of the electronic device 200. For example, the processor 120 may identify a content share request through NAN communication.

According to various embodiments of the disclosure, the memory 130 may store instructions configured to, when executed, enable the processor 120 to compose a neighbor awareness network (NAN) cluster for performing NAN communication with a plurality of external electronic devices (e.g., the second NAN device 202 or the third NAN device 203) as it receives the content share request through NAN communication. For example, the instructions may identify the service target device among the plurality of external electronic devices while performing NAN communication with the plurality of external electronic devices in response to a service discovery request and control to deactivate NAN communication in at least one external electronic device except for the identified service target device. The service discovery may include an operation for discovering the service target regardless of the communication protocol.

According to various embodiments of the disclosure, when the NAN cluster 200 is composed, the electronic device 500 may transmit an SDF including service group information to the NAN devices (e.g., 201, 202, 203, or 204) of the NAN cluster 200. For example, when the obtained service group information does not include information about the corresponding device, the devices receiving the SDF may make a setting so that NAN communication is deactivated.

According to various embodiments of the disclosure, the display device 160 may display the result of the service discovery through NAN communication. For example, among the devices in the NAN cluster 200, at least one external electronic device discovered may be displayed as a result of the service discovery.

According to various embodiments of the disclosure, the electronic device 500 may perform NAN communication with the device selected by the user among the at least one external electronic device output. For example, the NAN communication may include a function of sharing data with the selected device.

According to various embodiments of the disclosure, the communication module 190 may include a NAN communication module 510 or a BLE communication module 520. According to various embodiments, the NAN communication module 510 may be a Wi-Fi communication module or may include the Wi-Fi communication module.

According to various embodiments of the disclosure, it is described that the NAN communication module 510 or the BLE communication module 520 operates as a separate component. However, at least some of the components may be omitted or changed, and one component may be configured to perform the operation of the NAN communication module 510 or the BLE communication module 520.

According to various embodiments of the disclosure, an electronic device (e.g., the electronic device 101 or 500 or the first NAN device 201) may comprise at least one communication module (e.g., the communication module 190, the NAN communication module 510, or the BLE communication module 520), a processor 120 operatively connected with the at least one communication module, and a memory 130 operatively connected with the at least one communication module and the processor 120. The memory 130 may store instructions configured to, when executed, enable the processor 120 to compose a NAN cluster communicating with a plurality of external electronic devices (e.g., the second NAN device 202 or the third NAN device 203) based on a first communication protocol, through the at least one communication module, identify a service target device among the plurality of external electronic devices, while operating with the plurality of external electronic devices based on the first communication protocol, in response to a service discovery request, and allow at least one external electronic device, except for the service target device, among the plurality of external electronic devices, to deactivate at least one function related to the first communication protocol, through the at least one communication module based on identifying the service target device.

According to various embodiments of the disclosure, the instructions may be configured to enable the processor 120 to control the at least one communication module to transmit, to the plurality of external electronic devices, a service group information message including the service target device based on identifying the service target device.

According to various embodiments of the disclosure, the electronic device (e.g., the electronic device 101 or 500 or the first NAN device 201) may further comprise a display device 160. The instructions may be configured to enable the processor 120 to control the display device to output information about the plurality of external electronic devices and control the at least one communication module to transmit the service group information message based on identifying a user's selection input for the service target device among the plurality of external electronic devices through the display device.

According to various embodiments of the disclosure, the instructions may be configured to enable the processor 120 to, when an execution cancel input for content sharing is identified, control the at least one communication module to transmit, to the plurality of external electronic devices, a service cancel message to deactivate at least one function related to the first communication protocol. For example, the execution cancel input for the content sharing may include a specific button input or a specific user input.

According to various embodiments of the disclosure, the instructions may be configured to enable the processor 120 to control the at least one communication module to perform the service discovery based on a second communication protocol operating with lower power than the first communication protocol while at least one function related to the first communication protocol is inactive. For example, the first communication protocol may be a NAN communication protocol, and the second communication protocol may be a Bluetooth low energy (BLE) communication protocol.

According to various embodiments of the disclosure, an electronic device (e.g., the electronic device 101 or 500, the second NAN device 202, or the third NAN device 203) may comprise at least one communication module (e.g., the communication module 190, the NAN communication module 510, or the BLE communication module 520), a processor 120 operatively connected with the at least one communication module, and a memory 130 operatively connected with the at least one communication module and the processor 120. The memory 130 may store instructions configured to, when executed, enable the processor 120 to compose a NAN cluster communicating with a first electronic device (e.g., the first NAN device 201) based on a first communication protocol, through the at least one communication module, control the at least one communication module to transmit a service discovery request to the first electronic device, obtain service group information from the first electronic device, according to the transmission of the service discovery request, identify whether the service group information includes information about the electronic device, and control the at least one communication module to deactivate at least one function related to the first communication protocol if it is identified that the service group information does not include the information about the electronic device.

According to various embodiments of the disclosure, the instructions may be configured to enable the processor 120 to identify a time from the transmission of the service discovery request to reception of the service group information and control the at least one communication module to deactivate the at least one function related to the first communication protocol as the identified time exceeds a specific value.

According to various embodiments of the disclosure, the instructions may be configured to enable the processor 120 to obtain a service cancel message from the first electronic device through the at least one communication module and control the at least one communication module to deactivate the at least one function related to the first communication protocol according to the reception of the service cancel message.

Figure 6:
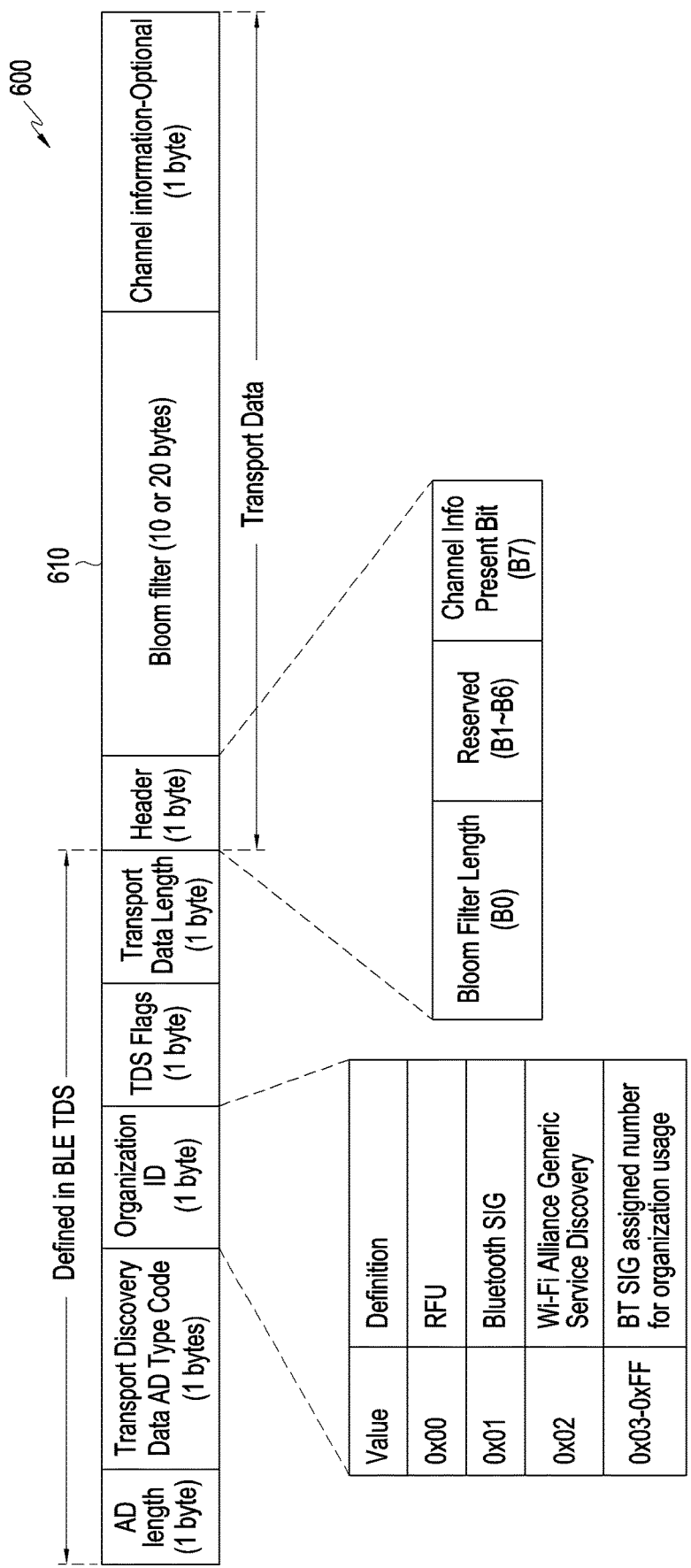
FIG. 6 is a view illustrating an example of a data structure according to various embodiments of the disclosure.

FIG. 6 is a view illustrating an example of a data structure according to various embodiments of the disclosure.

According to various embodiments of the disclosure, a NAN device may perform low-power NAN (BLE triggers NAN) operating in a BLE scan mode upon first operation, so as to reduce the current consumption caused when activating the NAN communication module first in the passive scan mode.

According to various embodiments of the disclosure, the state in which NAN communication is activated through the BLE trigger (e.g., a state in which the Wi-Fi communication module is activated) may be referred to as a NAN mode.

Referring to FIG. 6, an electronic device (e.g., the first NAN device 201 or the electronic device 500) may transmit a BLE TDS packet 600 when low-power NAN communication is performed. The BLE TDS packet 600 may include transport data and an 'AD length' field defined in BLE TDS, a 'transport discovery data AD type code' field, an 'organization ID' field, a 'TDS flags' field, or a 'transport data length' field. According to the value defined in the 'organization ID' field, the type of communication may be indicated.

According to various embodiments of the disclosure, the transport data may include a header, a various bloom filters field 610, or a 'channel information optional' field. For example, the header may include a 'bloom filter length' field, a 'reserved' field, or a 'channel information info present bit' field.

According to various embodiments of the disclosure, the bloom filter field 610 may include a hashed bloom filter configuration. The bloom filter configuration may indicate a browser action for an activation request of a matched device service or data link, a service provider, and a service discovery without an activation request for a matched data link.

According to various embodiments of the disclosure, the NAN device receiving the BLE TDS packet 600 may hash a bloom filter in the BLE TDS packet 600 and identify the service information. When the service information is matched, the NAN device receiving the BLE TDS packet 600 may activate the NAN radio and may compose a NAN cluster (e.g., the NAN cluster 200) to perform service discovery on devices (e.g., 201, 202, 203 or 204) in the NAN cluster 200.

According to various embodiments of the disclosure, the NAN devices (e.g., 201, 202, 203 or 204) in the NAN cluster 200 may register a scan filter. For example, the scan filter is for restricting only designated electronic devices as scan targets and may include the identifier, address, service information, or manufacturer information about the scan target device.

According to various embodiments of the disclosure, the service information may include a service name. The NAN devices (e.g., 201, 202, 203 or 204) may identify whether the service name obtained from the received BLE TDS packet corresponds to the service name set in the scan filter.

According to various embodiments of the disclosure, the NAN devices (e.g., 201, 202, 203 or 204) may register the scan filter and operate in a service standby mode while BLE communication is active. For example, when the NAN devices (e.g., 201, 202, 203 or 204) receive a BLE TDS packet including information matching service information registered in the scan filter in the service standby mode, the NAN devices may scan the device according to the scan device.

According to various embodiments of the disclosure, even when the NAN devices (e.g., 201, 202, 203 or 204) operate in the sleep mode, the corresponding service information may be offloaded from the BLE communication module of the corresponding device and stored, and it may be identified whether the service information of the BLE TDS packet received through the BLE communication module matches the service information set in the scan filter.

Figure 7A:
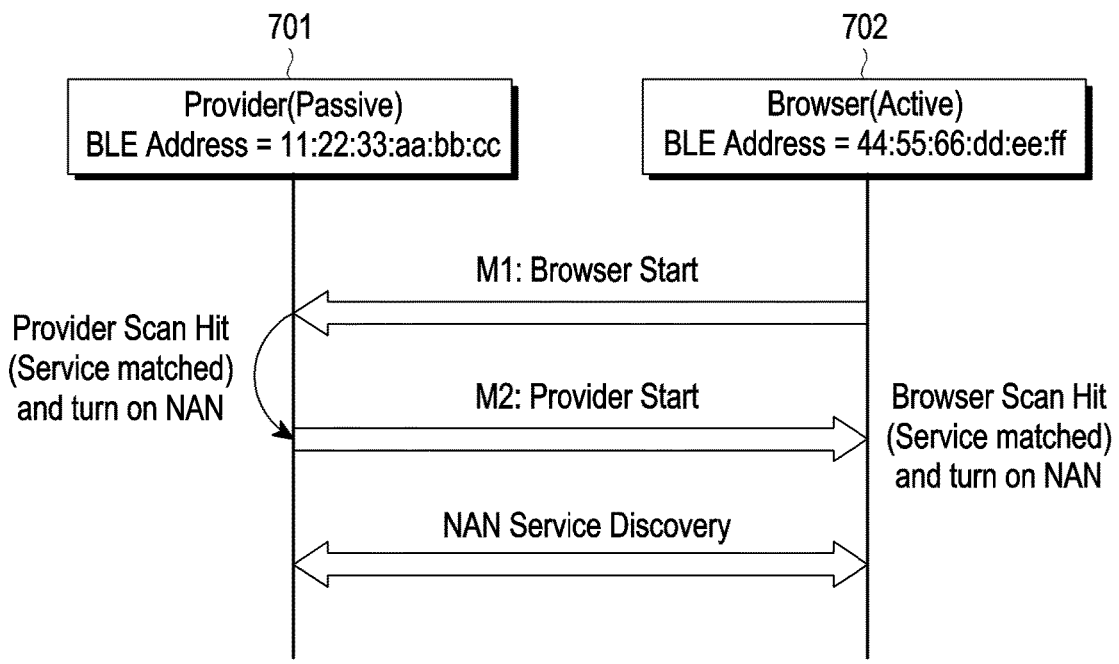
FIGS. 7A and 7B are flows illustrating an example of operations between NAN devices in a discovery protocol of low-power NAN communication according to various embodiments of the disclosure.
Figure 7B:
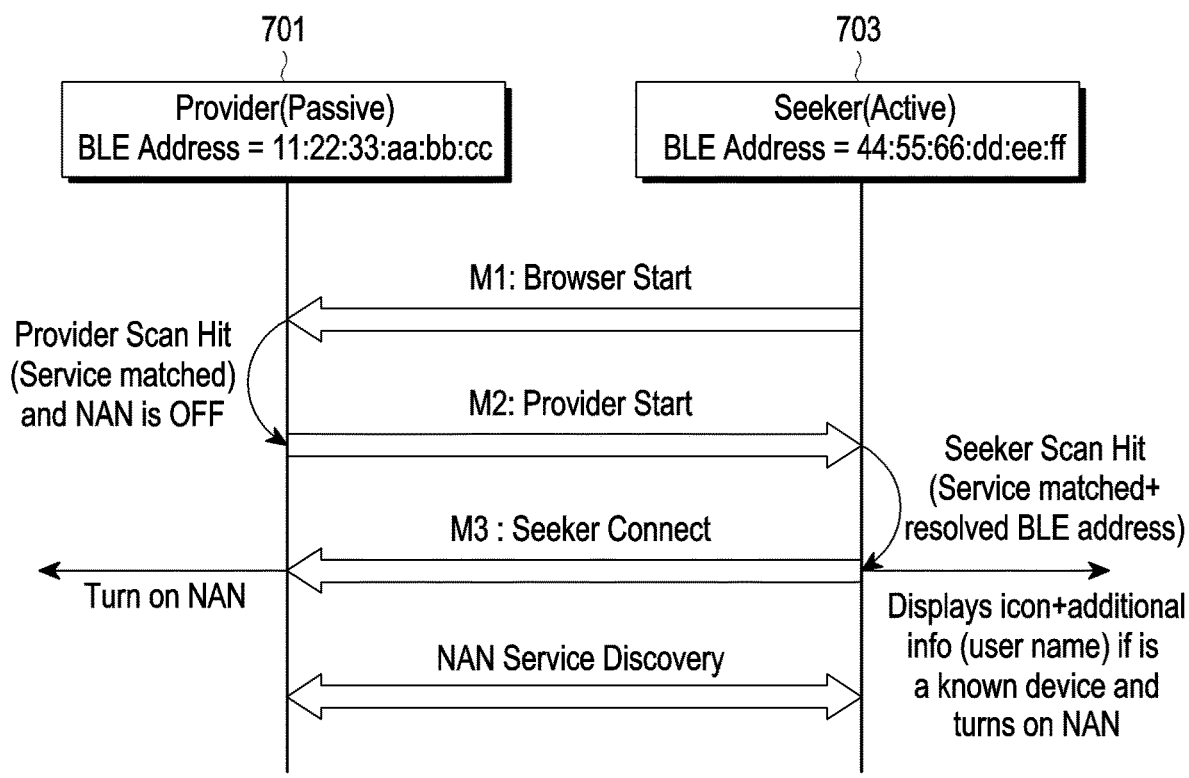

FIGS. 7A and 7B are flows illustrating an example of operations between NAN devices in a discovery protocol of low-power NAN communication according to various embodiments of the disclosure.

According to various embodiments of the disclosure, when discovery is performed to perform a NAN communication function through BLE, the NAN devices may be operated based on at least one of a provider mode in which a passive scan is performed or a browser mode in which an active scan is performed.

Referring to FIG. 7A, a device 702 in the browser mode may send an M1 message to a device 701 in the provider mode. The M1 message is an indirect advertisement message including a searched service and may be transmitted in a state in which the device 701 in the provider mode and the device 702 in the browser mode are not connected.

According to various embodiments of the disclosure, upon determining that service is matched with the device 702 in the browser mode, the device 701 in the provider mode may activate NAN communication.

According to various embodiments of the disclosure, the device 701 in the provider mode may transmit an M2 message to the device 702 in the browser mode. The M2 message may be an advertisement message including information about the matched service.

According to various embodiments of the disclosure, the device 702 in the browser mode may identify matched service information through the received M2 message and may activate NAN communication.

According to various embodiments of the disclosure, the device 701 in the provider mode and the device 702 in the browser mode may perform NAN service discovery.

Referring to FIG. 7B, to perform a NAN communication function through BLE, NAN devices operate based on at least one of a provider mode for performing a passive scan or a seeker mode for performing an active scan.

According to various embodiments of the disclosure, the device 703 in the seeker mode may transmit an M1 message to the device 701 in the provider mode.

According to various embodiments of the disclosure, the device 701 in the provider mode, receiving the M1 message, may determine that service is matched with the device 703 in the seeker mode, in the inactive state of NAN communication (OFF state) and transmit an M2 message to the device 703 in the seeker mode. The M2 message may include a BLE address corresponding to the device 701 in the provider mode.

According to various embodiments of the disclosure, according to reception of the M2 message, the device 703 in the seeker mode may further identify the BLE address of the device 701 in the provider mode and the matched service.

According to various embodiments of the disclosure, by identifying the device 701 in the provider mode, the device 703 in the seeker mode may display a designated icon on the screen and activate NAN communication. According to various embodiments, if the device 701 in the provider mode is a known device, additional information (e.g., user name) corresponding to the device 701 in the provider mode, along with the designated icon, may be displayed on the screen.

According to various embodiments of the disclosure, the device 703 in the seeker mode may transmit an M3 message to the device 701 in the provider mode. For example, the M3 message may be a message for activating NAN communication of a specific device in the provider mode, corresponding to the identified BLE address.

According to various embodiments of the disclosure, the device 701 in the provider mode, receiving the M3 message, may change the NAN communication into an active state (ON state). For example, as the device 701 in the provider mode and the device 703 in the seeker mode both activate NAN communication, they perform NAN service discovery.

According to various embodiments, as the NAN service discovery is performed, the device 701 in the provider mode may discover the device 702 in the browser mode or the device 703 in the seeker mode and compose a NAN cluster including the device 702 in the browser mode or the device 703 in the seeker mode. For example, the device 701 in the provider mode may transmit, to devices in the NAN cluster, service group information indicating whether NAN communication is performed with the device 702 in the browser mode or the device 703 in the seeker mode.

According to various embodiments of the disclosure, the devices in the NAN cluster, receiving the service group information, may control to deactivate NAN communication in the corresponding device depending on whether the service group information includes information about the corresponding information.

According to various embodiments of the disclosure, activating the BLE communication module and performing NAN communication may be a synced protocol, and the advertisement packet during each step is not one-time one but may rather be repeatedly transmitted when the advertisement packet of the peer meets a request, when the user cancels it, or until a designated time elapses.

Table 1 shows an example of discovery power consumption in the NAN communication module (e.g., 510) and the BLE communication module (e.g., 520) when performing NAN communication, according to various embodiments of the disclosure.

TABLE 1

| Power Consumption Profile | NAN | | BLE |
|---|---|---|---|
| | Device Role-Master | Device Role-Non-Master | BLE scan |
| Discovery | 4.6 mA (single band) 10 mA (dual band) | 3.0 mA (single band) 5.4 mA (dual band) | <1 mA |

Referring to Table 1, it may be identified that current consumption may be saved by applying a BLE trigger mode upon NAN communication. For example, when the electronic device waits in the BLE scan mode, it may be identified that a power of 1 mA or less is consumed through the BLE communication module according to the scan period and duration. In contrast, when identifying the current consumption in service discovery of the master-role device (device role-master) and the non-master-role device (device role-non-master) when NAN communication is activated through the BLE trigger (e.g., when the Wi-Fi communication module is activated), the non-master-role device may consume a current of 3.0 mA and the master-role device may consume a current of 4.6 mA if only channel 6 of 2.4 GHz band is used (signal band). When service discovery is performed using both the 2.4 GHz band and the 5 GHz band (dual-band), the non-master-role device may consume a current of 5.4 mA, and the master-role device may consume a current of 10 mA. According to various embodiments of the disclosure, the state in which NAN communication is activated through the BLE trigger (e.g., a state in which the Wi-Fi communication module is activated) may be referred to as a NAN mode.

According to various embodiments of the disclosure, NAN devices may optimize standby current consumption while waiting in the BLE scan mode. By optimizing standby current consumption, NAN devices may perform NAN service discovery by activating the NAN communication module only when receiving a BLE TDS advertisement packet having the same service information.

According to various embodiments of the disclosure, information related to a device that has started a service may be transmitted to the devices in the NAN cluster, so that devices that do not perform a service may deactivate the NAN mode and may thus be prevented from power consumption that would occur otherwise in operating in the NAN mode.

Figure 8:
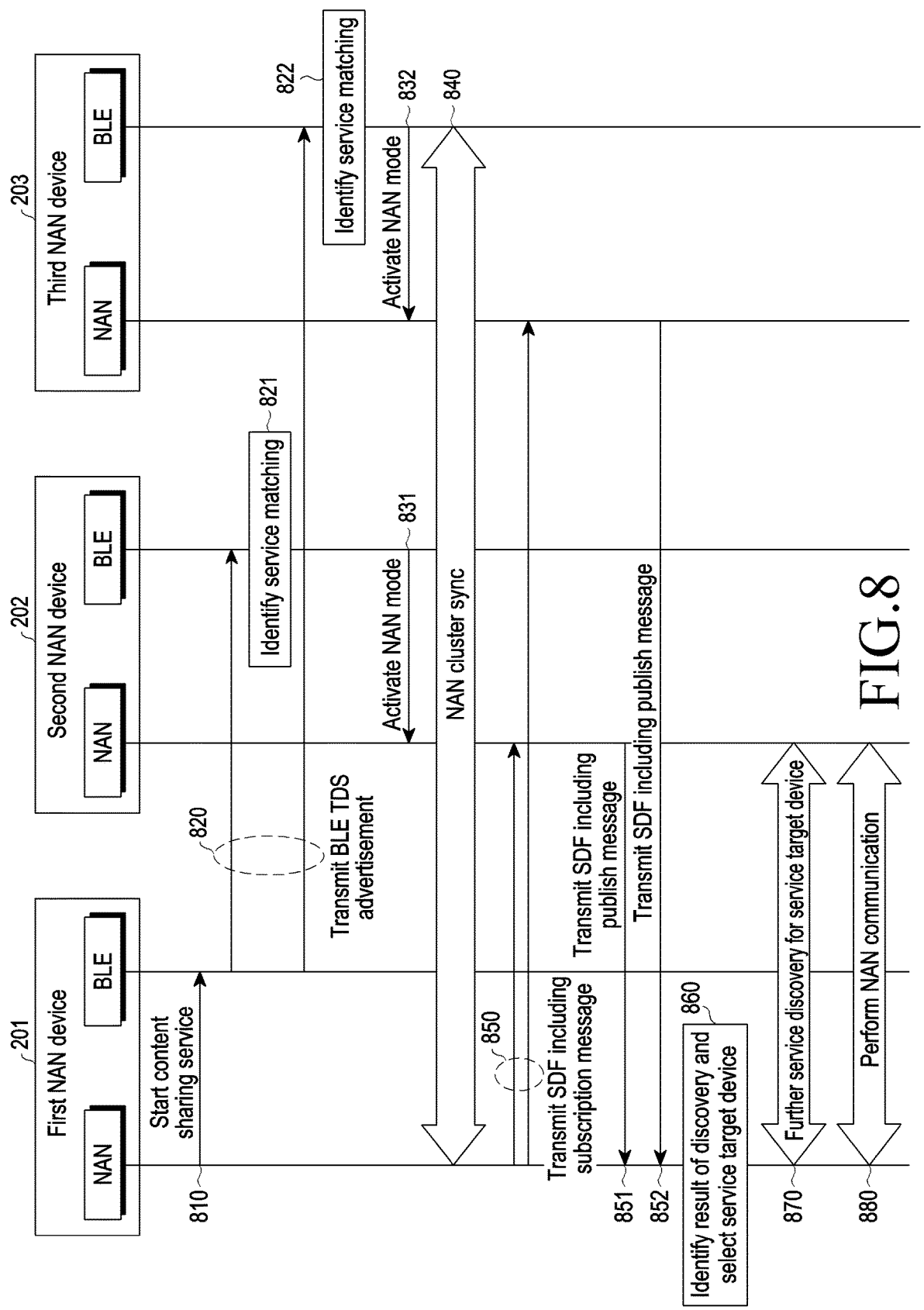
FIG. 8 is a flowchart illustrating an example of a time synchronization operation in a NAN cluster according to various embodiments of the disclosure.

FIG. 8 is a flowchart illustrating an example of a time synchronization operation in a NAN cluster according to various embodiments of the disclosure.

Referring to FIG. 8, a NAN cluster (e.g., the NAN cluster 200 of FIG. 2) may include a first NAN device 201 (or the electronic device 500), a second NAN device 202, and a third NAN device 203.

In operation 810, if the first NAN device 201 identifies a content share request through NAN communication, it may transfer a command of starting NAN service through BLE communication. For example, the NAN service may include a service, a game, or a messenger service for the user to share specific content (e.g., an image, text or file) with other users through NAN. Other various service types through NAN communication are also possible. Upon obtaining a specific input, the first NAN device 201 may identify the content share request.

In operation 820, the first NAN device 201 may transmit the BLE TDS advertisement to NAN devices (e.g., the second NAN device 202 or the third NAN device 203) of the NAN cluster through BLE communication. For example, the first NAN device 201 may transmit the BLE TDS advertisement to discover a device to perform BLE communication.

In operation 821, the second NAN device 202 may identify that service is matched with the first NAN device 201 based on the BLE TDS advertisement received through BLE communication. For example, the second NAN device 202 may identify the service information included in the BLE TDS advertisement, thereby identifying whether service is matched with the first NAN device 201.

In operation 822, the third NAN device 203 may identify that the service is matched based on the BLE TDS advertisement received through BLE communication. For example, the third NAN device 203 may identify service information included in the BLE TDS advertisement to identify whether service is matched with the first NAN device 201.

In operation 831, the second NAN device 202 may activate NAN communication while BLE communication is active. For example, as it is identified that service is matched with the first NAN device 201 based on the BLE TDS advertisement transmitted from the first NAN device 201, the second NAN device 202 may activate NAN communication.

In operation 832, the third NAN device 203 may activate NAN communication while BLE communication is active. For example, when it is determined that service is matched with the first NAN device 201, the third NAN device 203 may activate NAN communication.

In operation 840, the first NAN device 201, the second NAN device 202, and the third NAN device 203 may compose a NAN cluster and perform NAN cluster synchronization. For example, the NAN cluster synchronization is a time synchronization function (TSF, hereinafter, referred to as 'TSF') that synchronizes the NAN devices of the NAN cluster to a common time, and through the NAN cluster synchronization, the NAN devices may perform service discovery to transmit NAN beacon frames at the synchronized time.

In operation 850, the first NAN device 201 may transmit a subscription-type SDF to the second NAN device 202 and the third NAN device 203 through NAN communication. For example, the subscription message may be a message requesting to transmit a publish message to NAN devices operating in the NAN cluster.

In operation 851, the NAN communication module of the second NAN device 202 may transmit an SDF including a publish message to the NAN communication module of the first NAN device 201.

According to various embodiments of the disclosure, the subscription message and the publish message may be included in the 'Service Descriptor Attributes' field of the SDF. The publish message may be used to search for NAN devices operating in a NAN cluster of an unsolicited type.

In operation 851, the second NAN device 202 may transmit a publish message to the first NAN device 201 in response to the SDF.

In operation 852, the NAN communication module of the third NAN device 203 may transmit an SDF including a publish message to the NAN communication module of the first NAN device 201.

In operation 860, the first NAN device 201 may identify the result of discovery based on the SDF including the publish message received from the second NAN device 202 and the third NAN device 203 and may select a service target device from among the devices identified as a result of the discovery.

According to various embodiments of the disclosure, the first NAN device 201 may transmit service group information including information related to the service target device to devices (e.g., the second NAN device 202 or the third NAN device 203) in the NAN cluster 200. For example, the devices (e.g., the second NAN device 202 or the third NAN device 203) in the NAN cluster 200 identify the obtained service group information and, if the information about the corresponding device is not included, control to deactivate NAN communication in the corresponding device.

In operation 870, the first NAN device 201 may perform further service discovery for the second NAN device 202. For example, the first NAN device 201 may identify that the user selects the second NAN device 202 as a service target device, set a further service discovery attribute in the SDF, and transmit it to the second NAN device 202. The further service discovery attribute may include parameters used to indicate the function of the NAN device during a period between DWs so as to receive the SDF.

In operation 880, the first NAN device 201 and the second NAN device 202 may perform NAN communication.

According to various embodiments of the disclosure, the first NAN device 201 may transmit service group information according to performing the further discovery to the devices in the NAN cluster 200. For example, the other devices than the service target device (e.g., the second NAN device 202) among the devices in the NAN cluster 200 may identify that the service group information according to performing the further discovery does not include information about the corresponding device and control to deactivate NAN communication.

Figure 9:
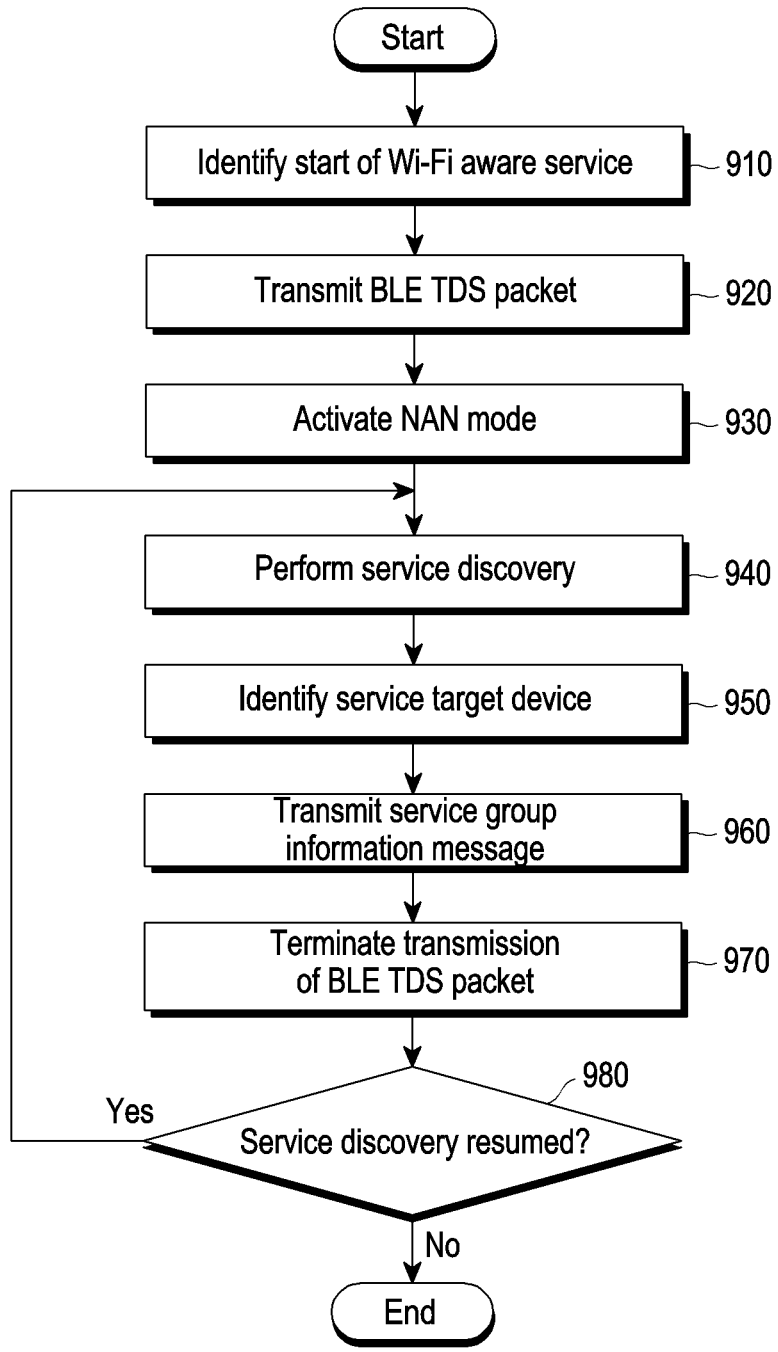
FIG. 9 is a flowchart illustrating an example of operations of a NAN device according to various embodiments of the disclosure.

FIG. 9 is a flowchart illustrating an example of operations of a NAN device according to various embodiments of the disclosure.

Referring to FIG. 9, in operation 910, the electronic device 500 (e.g., the first NAN device 201) may identify the start of a Wi-Fi aware service. For example, the Wi-Fi aware service may include various services (e.g., content sharing, multimedia streaming, remote device (e.g., microphone) control, offline call/message transmission/reception/high-speed bi-directional communication, or peripheral device information discovery) between adjacent electronic devices through low-power NAN communication based on a Wi-Fi infrastructure.

In operation 920, the electronic device 500 may transmit a BLE TDS packet to the devices in the NAN cluster.

In operation 930, the electronic device 500 may activate the NAN mode.

In operation 940, the electronic device 500 may perform service discovery for the devices in the NAN cluster. For example, the electronic device 500 may search for a plurality of external electronic devices that have transmitted a response to the BLE TDS packet according to performing the service discovery.

In operation 950, the electronic device 500 may identify a service target device. For example, the electronic device 500 displays a list of the plurality of external electronic devices and identify at least one external electronic device, which is selected by the user or meets a predesignated condition among the plurality of external electronic devices, as the service target device. The predesignated condition may include, e.g., whether the communication state or distance from the electronic device 500 meets a designated value or whether it is a predesignated electronic device for a specific service.

In operation 960, the electronic device 500 may transmit the service group information message to the devices included in the list. For example, the service group information message may include the ID information, group ID, or address information about at least one external electronic device included in the service group. The service group information message may be included and transmitted/received in an SDF or NAN action frame (NAF) or may be transmitted/received through BLE communication.

According to various embodiments, the service group information message may be transmitted, with the service group information included in the field set as 'reserved' in each frame when it is transmitted in the form of an SDF or NAF. For example, the service group information may be set for devices identified as service target devices.

According to various embodiments of the disclosure, the electronic device 500 may store the service group information message. When a service group information message including changed information is obtained, the electronic device 500 may update information about the stored service group information message.

According to various embodiments of the disclosure, the electronic device 500 and the service target device may perform communication in the service group. For example, they may exchange SDFs or perform NDP communication.

In operation 970, the electronic device 500 may terminate transmission of the BLE TDS packet.

In operation 980, the electronic device 500 may determine whether service discovery is resumed. For example, the electronic device 500 may repeatedly perform service discovery as a DW period arrives according to the NAN cluster operation.

As a result of performing operation 980, if service discovery is resumed, the electronic device 500 may perform operation 940 to thereby perform service discovery. According to an embodiment, as a result of performing operation 980, if operation 940 is performed so that service discovery is resumed, operation 970 may be omitted.

As a result of performing operation 980, if service discovery is not resumed, the electronic device 500 may terminate the service discovery operation and identify the termination of the Wi-Fi aware service.

Figure 10:
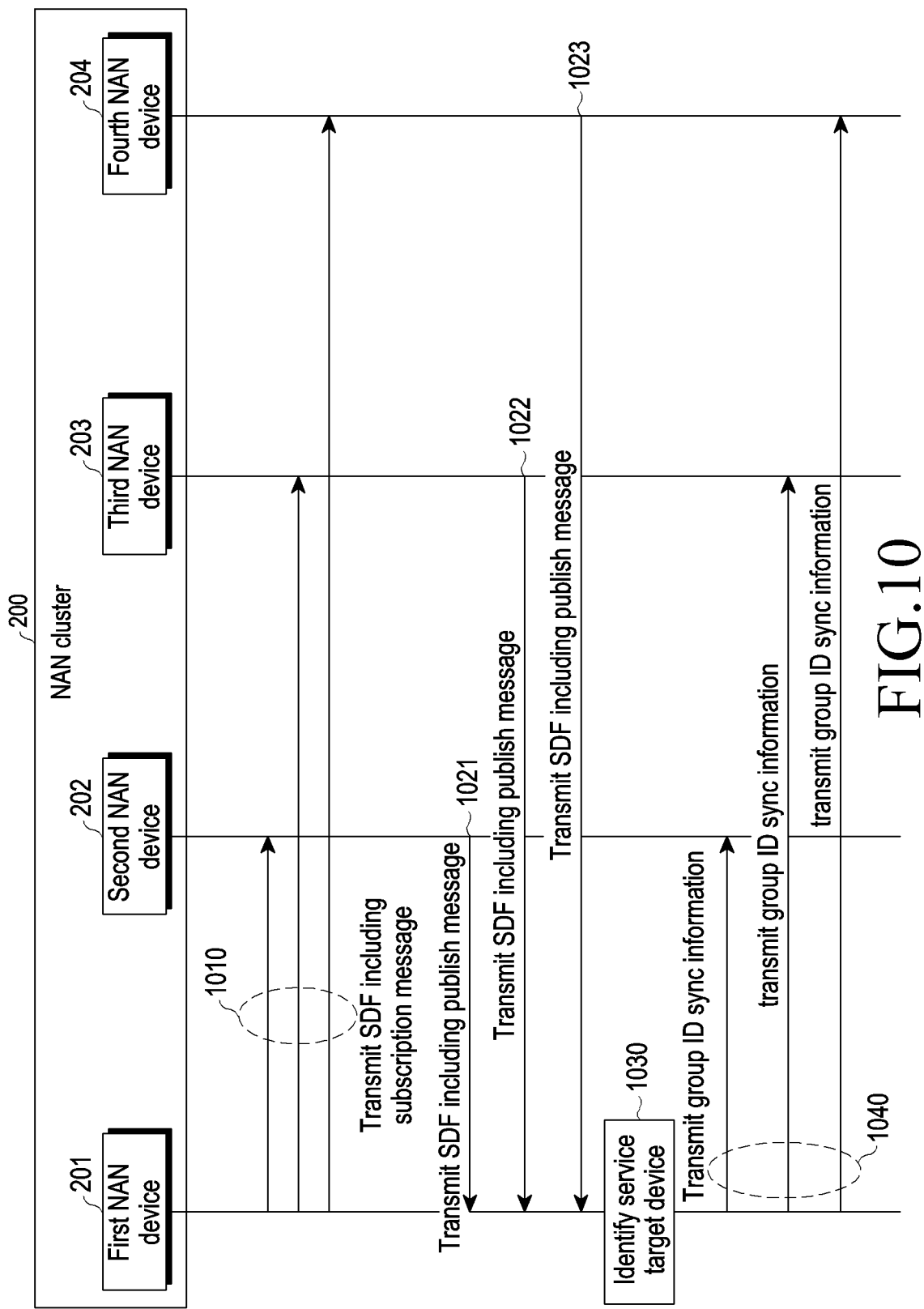
FIG. 10 is a flowchart illustrating an example of a synchronization operation between devices in a NAN cluster according to various embodiments of the disclosure.

FIG. 10 is a flowchart illustrating an example of a synchronization operation between devices in a NAN cluster according to various embodiments of the disclosure.

Referring to FIG. 10, a NAN cluster (e.g., the NAN cluster 200 of FIG. 2) may include a first NAN device 201, a second NAN device 202, a third NAN device 203, and a fourth NAN device 204.

In operation 1010, the first NAN device 201 may transmit an SDF including a subscription message to the devices (e.g., 202, 203 or 204) in the NAN cluster.

In operation 1021, the second NAN device 202 may transmit an SDF including a publish message to the first NAN device 201 in response to the received subscription message.

In operation 1022, the third NAN device 203 may transmit an SDF including a publish message to the first NAN device 201 in response to the received subscription message.

In operation 1023, the fourth NAN device 204 may transmit an SDF including a subscription message to the first NAN device 201 in response to the received subscription message.

In operation 1030, the first NAN device 201 may identify a service target device among the NAN devices that have transmitted the publish message. For example, the first NAN device 201 may identify the third NAN device 203 and the fourth NAN device 204 selected by the user among the NAN devices.

In operation 1040, the first NAN device 201 may transmit group ID synchronization information to the second NAN device 202, the third NAN device 203, and the fourth NAN device 204. For example, the group ID synchronization information may include group ID information preset for the service target device and may be transmitted in a unicast or broadcast manner.

According to various embodiments of the disclosure, the group ID synchronization information transmitted to the second NAN device 202, the third NAN device 203, and the fourth NAN device 204 may include information about the third NAN device 203 and the fourth NAN device 204 selected by the user as service target devices. For example, if the second NAN device 202 identifies that the received group ID synchronization information does not include information about the second NAN device 202, the second NAN device 202 may control to deactivate NAN communication in the second NAN device 202.

According to various embodiments of the disclosure, the group ID synchronization information may be transmitted in the form of a follow-up message. For example, the follow-up message may include a follow-up function that provides a means for services or applications that receive service-specific information from a NAN device or transmit service-specific information to a NAN device. The follow-up function may generate a follow-up message from a configuration received from a service or application in the transmission method and may request transmission of a message from the transmission control function.

According to various embodiments of the disclosure, devices that have transmitted or received the follow-up message may be synchronized with the same group ID (e.g., "A").

Table 2 shows the formats and values defined in the NAN SDF.

TABLE 2

| Field | Size (Octets) | Value (Hex) | Description |
| --- | --- | --- | --- |
| Category | 1 | 0x04 or 0x09 | IEEE 802.11 Public Action frame or Protected Dual of Public Action frame |
| Action | 1 | 0x09 | IEEE 802.11 Public Action frame Vendor Specific |
| OUI | 3 | 0x50-6F-9A | Wi-Fi Alliance specific OUI |
| OUI Type | 1 | 0x13 | Identifying the type and version of the NAN |
| NAN attributes | Variable | Variable | One or more NAN attributes |

Referring to Table 2, the NAN SDF may be transmitted to inform that service discovery is terminated and to request deactivation of the NAN radio. According to various embodiments of the disclosure, the NAN SDF may include a 'NAN attributes' field indicating service information. For example, 'NAN attributes' may include at least one attribute including information for service performance. For example, the NAN device identifies the service information and, as it determines that service is matched with the device that has transmitted the NAN SDF, the NAN device may control to activate NAN communication. Table 3 illustrates subtypes of NAN action frames according to various embodiments of the disclosure.

TABLE 3

| OUI Subtype | Notes |
| --- | --- |
| 0 | Reserved |
| 1 | Ranging Request |
| 2 | Ranging Response |
| 3 | Ranging Termination |
| 4 | Ranging Report |
| 5 | Data Path Request |
| 6 | Data Path Response |
| 7 | Data Path Confirm |
| 8 | Data Path Key Installment |
| 9 | Data Path Termination |
| 10 | Schedule Request |
| 11 | Schedule Response |
| 12 | Schedule Confirm |
| 13 | Schedule Update Notification |
| 14-255 | Reserved |

Referring to Tables 2 and 3, when the NAN device transmits the SDF in a NAN action frame, the format and value defined in the NAN SDF or the subtype of the NAN action frame may be defined. For example, in the NAN action frame, a subtype of a new action frame may be designated in a 'reserved' field (e.g., '14-255'). According to various embodiments of the disclosure, the NAN action frame may include an 'OUI Subtype' field including information indicating the type of operation in NAN communication to be actually performed and an 'information content' field including information about various attributes required for the corresponding operation. For example, according to various embodiments of the disclosure, the NAN action frame may include operation information having an arbitrary value, and the operation information may be a predesignated value between NAN devices performing the same service. For example, one of the occupied '14-255' fields of the NAN action frame may include information for terminating discovery or deactivating the NAN radio.

Table 4 defines a format for a vendor-specific attribute according to various embodiments of the disclosure. For example, the vendor-specific attribute may be reserved.

TABLE 4

| Field | Size (octets) | Value | Description |
| --- | --- | --- | --- |
| Attribute ID | 1 | 0xDD | Identifies the type of NAN attribute. |
| Length | 2 | Variable | Length of the following fields in the attribute. |
| OUI | 3 | Variable | Vendor Specific OUI |
| Body | Variable | Variable | Vendor Specific body that is implementation specific. |

Referring to Table 4, the information about the newly defined NAN action frame may be defined according to the format of the vendor-specific attribute. For example, the 'body' field may include actually necessary information. According to various embodiments of the disclosure, the NAN device may include information for distinguishing the corresponding NAN devices to maintain NAN cluster synchronization and perform the discovery operation, using the 'Body' field in the vendor-specific attribute. For example, the information may include the group ID information NAN cluster synchronized with information about the devices for NAN cluster synchronization and performing the discovery operation. According to various embodiments of the disclosure, the configuration of NAN cluster may be maintained for the NAN device set in the group ID information. In contrast, as the NAN device not set in the group ID information operates in the BLE scan mode in an inactivated state of NAN radio, it is possible to reduce power consumption due to the activation of NAN radio.

According to various embodiments of the disclosure, the 'body' field may include device information about the service group to be configured as a NAN cluster and in which discovery is performed. For example, the device information about the service group may include the NMI and NDIs of the device selected as the service target device in the service group or may include the device name of the device included in the publish message received from each device.

According to various embodiments of the disclosure, although it is described that the 'body' field includes information about the devices for maintaining the configuration of the NAN cluster, it may include information about the device operating in the BLE scan mode in the inactivated state of NAN radio.

Table 5 defines the format of the NAN information elements.

TABLE 5

| Field | Size (Octets) | Value (Hex) | Description |
|---|---|---|---|
| Element ID | 1 | 0xDD | IEEE 802.11 vendor specific information element |
| Length | 1 | Variable | Length of the following fields in the IE in octets. The Length field is variable, and set to 4 plus the total length of the NAN attributes. |
| OUI | 3 | 0x50-6F-9A | Wi-Fi Alliance specific OUT |
| OUI Type | 1 | 0x13 | Identifying the type and version of the NAN IE |
| NAN attributes | Variable | Variable | One or more NAN attribute |

Referring to Table 5, the SDF may include a plurality of NAN attribute information through the 'NAN attributes' field. For example, the plurality of feature information may include attribute information related to the service provided through NAN communication. According to various embodiments of the disclosure, the NAN device may determine whether service is matched with the NAN device having transmitted the SDF based on the attribute information included in the 'NAN attributes' field. For example, when the attribute information matches the service information about the NAN device, it may be determined that service is matched with the NAN device having transmitted the SDF. Table 6 shows attributes of various purposes, which may be included in the NAN attributes field of the SDF.

Referring to Table 6, the NAN attributes field may indicate attributes allowed or not allowed to be included in the NAN SDF frame. If allowed, whether the attribute is mandatory (M) or optional (O) may be included, and the mandatory NAN attributes may be included in the NAN SDF frame.

TABLE 6

| Attributes | NAN SDF frames | | | | |
|---|---|---|---|---|---|
| | Publish | Subscribe | | Follow-up | |
| | Data | Required | Ranging | Required | Otherwise |
| Master Indication attribute | NO | NO | NO | NO | NO |
| Cluster attribute | NO | NO | NO | NO | NO |
| Service ID List attribute | NO | NO | NO | NO | NO |
| Service Descriptor attribute | YES/M | YES/M | YES/M | YES/M | YES/M |

TABLE 6-continued

| Attributes | NAN SDF frames | | | | |
|---|---|---|---|---|---|
| | Publish | Subscribe | | Follow-up | |
| | Data | Required | Ranging | Required | Otherwise |
| NAN Connection Capability attribute | YES/O | YES/O | YES/O | YES/O | YES/O |
| WLAN Infrastructure attribute | YES/O | YES/O | YES/O | YES/O | YES/O |
| P2P Operation attribute | YES/O | YES/O | YES/O | YES/O | YES/O |
| IBSS attribute | YES/O | YES/O | YES/O | YES/O | YES/O |
| Mesh attribute | YES/O | YES/O | YES/O | YES/O | YES/O |
| Further NAN Service Discovery attribute | YES/O | YES/O | YES/O | YES/O | YES/O |
| Further Availability Map attribute | YES/O | YES/O | YES/O | YES/O | YES/O |
| Country Code attribute | YES/O | YES/O | YES/O | YES/O | YES/O |
| Ranging attribute | YES/O | YES/O | YES/O | YES/O | YES/O |
| Cluster Discovery attribute | NO | NO | NO | NO | NO |
| Service Descriptor Extension attribute | YES/M | YES/M | YES/O | YES/O | YES/O |
| Device Capability | YES/M | YES/M | YES/O | YES/O | YES/O |
| NDP attribute | NO | NO | NO | NO | NO |
| NAN availability | YES/M | YES/M | YES/O | YES/O | YES/O |
| NDC attribute | YES/O | YES/O | YES/O | YES/O | YES/O |
| NDL Attribute | NO | NO | NO | NO | NO |
| NDL QoS attribute | NO | NO | NO | NO | NO |
| Unaligned Schedule attribute | YES/O | YES/O | YES/O | YES/O | YES/O |
| Ranging Information attribute | NO | YES/M | NO | NO | YES/O |
| Ranging Setup attribute | NO | NO | NO | NO | NO |
| FTM Ranging Report attribute | NO | NO | NO | NO | NO |
| Element Container attribute | YES/O | YES/O | YES/O | YES/O | YES/O |
| Extended WLAN Infrastructure attribute | YES/O | YES/O | YES/O | YES/O | YES/O |
| Extended P2P Operation attribute | YES/O | YES/O | YES/O | YES/O | YES/O |
| Extended IBSS attribute | YES/O | YES/O | YES/O | YES/O | YES/O |
| Extended Mesh attribute | YES/O | YES/O | YES/O | YES/O | YES/O |
| Cipher Suite Info attribute | YES/O | YES/O | YES/O | YES/O | YES/O |
| Security Context Info attribute | YES/O | YES/O | YES/O | YES/O | YES/O |
| Shared-Key Descriptor attribute | NO | NO | NO | NO | NO |
| Public Availability attribute | YES/O | YES/O | YES/O | YES/O | YES/O |
| Vendor Specific attribute | YES/O | YES/O | YES/O | YES/O | YES/O |

According to various embodiments of the disclosure, it is possible to identify whether a service is matched using the service descriptor attribute or the service descriptor extended attribute of Table 6 above. Table 7 shows the service descriptor attribute (SDA). Referring to Table 7, each attribute may include mandatory fields and optional fields according to the content of the service discovery request, optional filter, and optional service specific information.

TABLE 7

| Field | Size (Octets) | Value (Hex) | Description |
|---|---|---|---|
| Attribute ID | 1 | 0x03 | Identifies the type of NAN attribute |
| Length | 2 | Variable | Length of the following fields in the attribute. |
| Service ID | 6 | Variable | Mandatory field that contains the hash of the Service Name. |
| Instance ID | 1 | Variable | Publish_ID or Subscribe_ID Value of zero is reserved |

TABLE 7-continued

| Field | Size (Octets) | Value (Hex) | Description |
| --- | --- | --- | --- |
| Requestor Instance ID | 1 | Variable | Instance ID from the frame that triggered the transmission if available, otherwise set to 0x00. |
| Service Control | 1 | Variable | Mandatory field that defines the Service Control bitmap as defined in Table 42 |
| Binding Bitmap | 0 or 2 | 0x0000 to0xFF FF | Optional field that indicates the binding of the SDA to post discovery connection attributes |
| Matching Filter Length | 0 or 1 | Variable | An optional field and present if a matching service discovery filter is used |
| Matching Filter | Variable | Variable | An optional field that is a sequence of length and value pairs that identify the matching service discovery filters, refer to FIG. 47 |
| Service Response Filter Length | 0 or 1 | Variable | An optional field and present if a service response filter is used. |
| Service Response Filter | Variable | Variable | An optional field that identifies the matching service response filters, refer to Table 44 |
| Service Info Length | 0 or 1 | Variable | An optional field and present if service specific information is used |
| Service Info | Variable | Variable | An optional field that contains the service specific information. Its content may be determined by the application and not specified herein. |

According to various embodiments of the disclosure, the 'Service Info' field of the SDA may include information (e.g., action type information) about an operation to be performed by the NAN device. For example, a service discovery operation or synchronization for the NAN cluster including specific devices may be performed through the information included in the 'Service Info' field. Table 8 shows the format of the service descriptor extension attribute (SDEA).

TABLE 8

| Field | Size (Octets) | Value | Description |
| --- | --- | --- | --- |
| Attribute ID | 1 | 0x0E | Identifies the type of NAN attribute. |
| Length | 2 | 0 or 1 | Length of the following fields in the attribute. This is an optional field. |
| Instance ID | 1 | Variable | The same value as in the Instance ID field of the associated Service Descriptor attribute. |
| Control | 2 | Variable | Information about the fields present. See Table 47. |
| Range Limit | 4 | 0 or 4 | Range limit given in centimeters. Refer to FIG. 48. This is an optional field. |
| Service Update Indicator | 1 | 0 or 2 | Monotonically increasing value indicating the current version of the service specific information corresponding to the publish instance, which may be conveyed by publish messages and/or FSD messages. This is an optional field. |
| Service Info Length | 0 or 2 | Variable | Length of the Service Info field. An optional field and present if Service Info field is present. |
| Service Info | Variable | Variable | An optional field that contains the service specific information. The format of Service Info field is shown in Table 49. |

Referring to Tables 7 and 8, NAN attribute information may be defined based on the SDA or the SDEA. For example, information may be included in the SDA or 'service info' field of the SDEA. According to various embodiments of the disclosure, Tables 7 and 8 commonly may include a 'service info' field for defining service specific information. The 'service info' field may be designated and used variously for each service. According to various embodiments of the disclosure, the electronic device 500 (or the first NAN device 201) may transmit information for distinguishing devices capable of performing NAN cluster synchronization or service discovery using the 'service info' field. For example, the 'service info' field may include NAN device information or synchronized group ID information selected based on the result of service discovery.

According to various embodiments of the disclosure, devices synchronized for the group ID may maintain the configuration of the NAN cluster, and devices not synchronized for the group ID may deactivate NAN radio and perform a BLE scan operation to reduce current consumption.

According to various embodiments of the disclosure, the 'service info' field may include device information about the service group included in the NAN cluster and service discovered. For example, the device information may include interface addresses (e.g., NAN management interface addresses (NMIs) or NAN data interface addresses (NDIs)) of corresponding devices and device names included in the publish messages received from the corresponding devices.

According to various embodiments of the disclosure, it is described that the 'service info' field includes information about the device included in the NAN cluster. However, information about devices to deactivate NAN radio and return to the state of the BLE scan mode may also be included.

Figure 11:
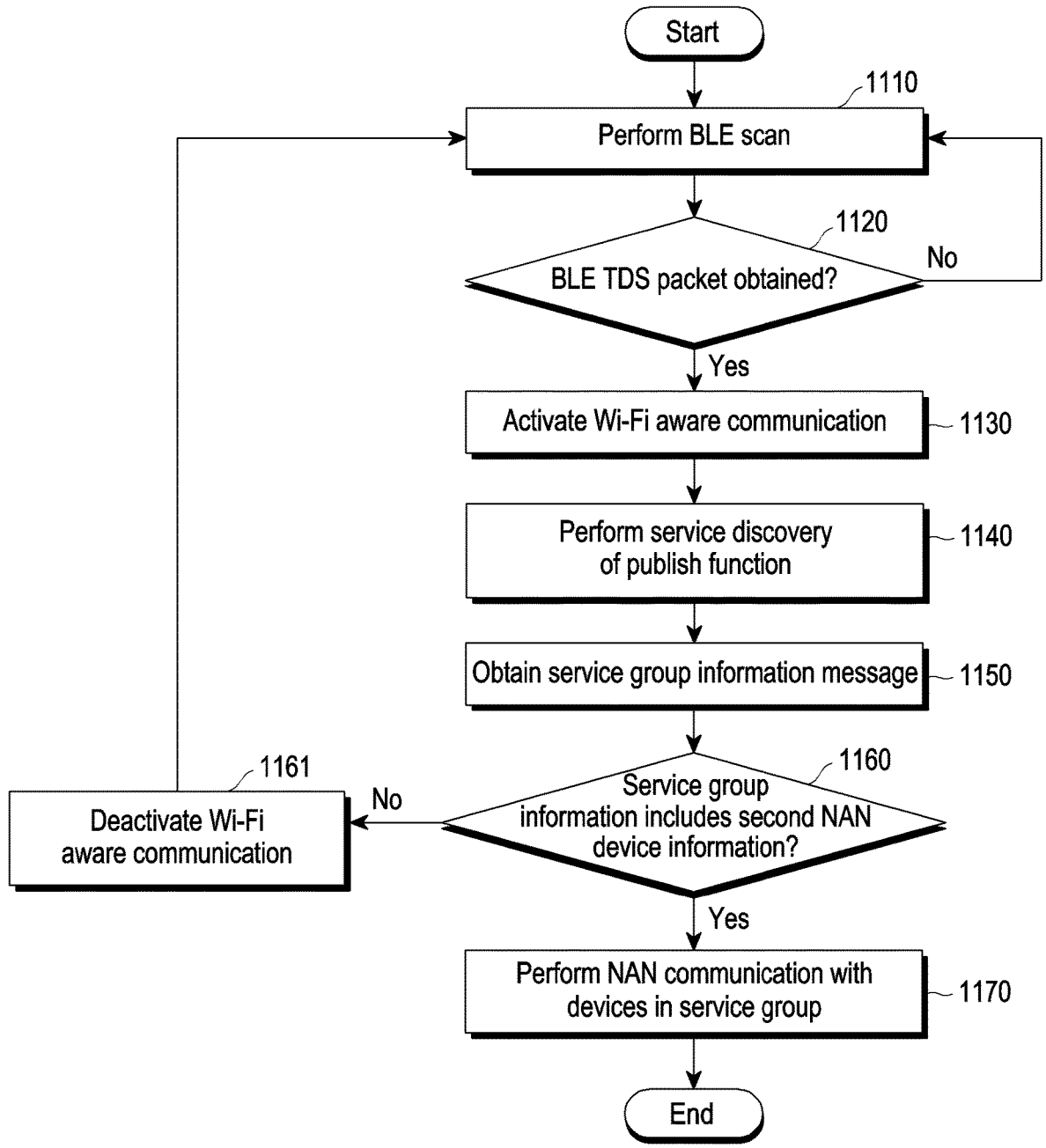
FIG. 11 is a flowchart illustrating an example of an operation of deactivating NAN communication in a NAN device according to various embodiments of the disclosure.

FIG. 11 is a flowchart illustrating an example of an operation of deactivating NAN communication in a NAN device according to various embodiments of the disclosure.

Referring to FIG. 11, a NAN cluster 200 may include at least one NAN device (e.g., the first NAN device 201 or the second NAN device 202).

In operation 1110, the second NAN device 202 may perform a BLE scan. For example, the BLE scan may include the operation of waiting to receive a BLE TDS packet from an external electronic device in the BLE communication mode.

In operation 1120, the second NAN device 202 may determine whether to receive a BLE TDS packet from the first NAN device 201.

As a result of performing operation 1120, when the second NAN device 202 does not receive the BLE TDS packet, the second NAN device 202 may perform a BLE scan in operation 1110.

In operation 1130, as a result of performing operation 1120, if the second NAN device 202 identifies that the BLE TDS packet is received, the second NAN device 202 may activate Wi-Fi aware communication. For example, if the second NAN device 202 identifies that service is matched with the first NAN device 201 through the received BLE TDS packet, the second NAN device 202 may activate NAN radio to enable Wi-Fi aware communication.

In operation 1140, the second NAN device 202 may transmit a publish message to perform service discovery of a publishing function of searching for an external electronic device.

In operation 1150, the second NAN device 202 may obtain a message including service group information from the first NAN device 201. For example, the service group information may include information about electronic devices constituting a specific NAN cluster in which NAN communication is performed.

In operation 1160, the second NAN device 202 may identify whether information about the second NAN device 202 is included in the obtained service group information.

As a result of performing operation 1160, when the service group information does not include information about the second NAN device 202, the second NAN device 202 may deactivate the NAN radio to inactivate Wi-Fi aware communication in operation 1161.

According to various embodiments of the disclosure, the second NAN device 202 may deactivate NAN radio according to identifying that it does not perform Wi-Fi aware communication with the first NAN device 201 based on the obtained service group information. For example, the second NAN device 202 may reduce unnecessary power consumption that would occur if NAN radio were active, while Wi-Fi aware communication is not performed.

If the service group information includes the information about the second NAN device 202 as a result of performing operation 1160, the second NAN device 202 may perform NAN communication with the devices included in the service group information in operation 1170.

Figure 12:
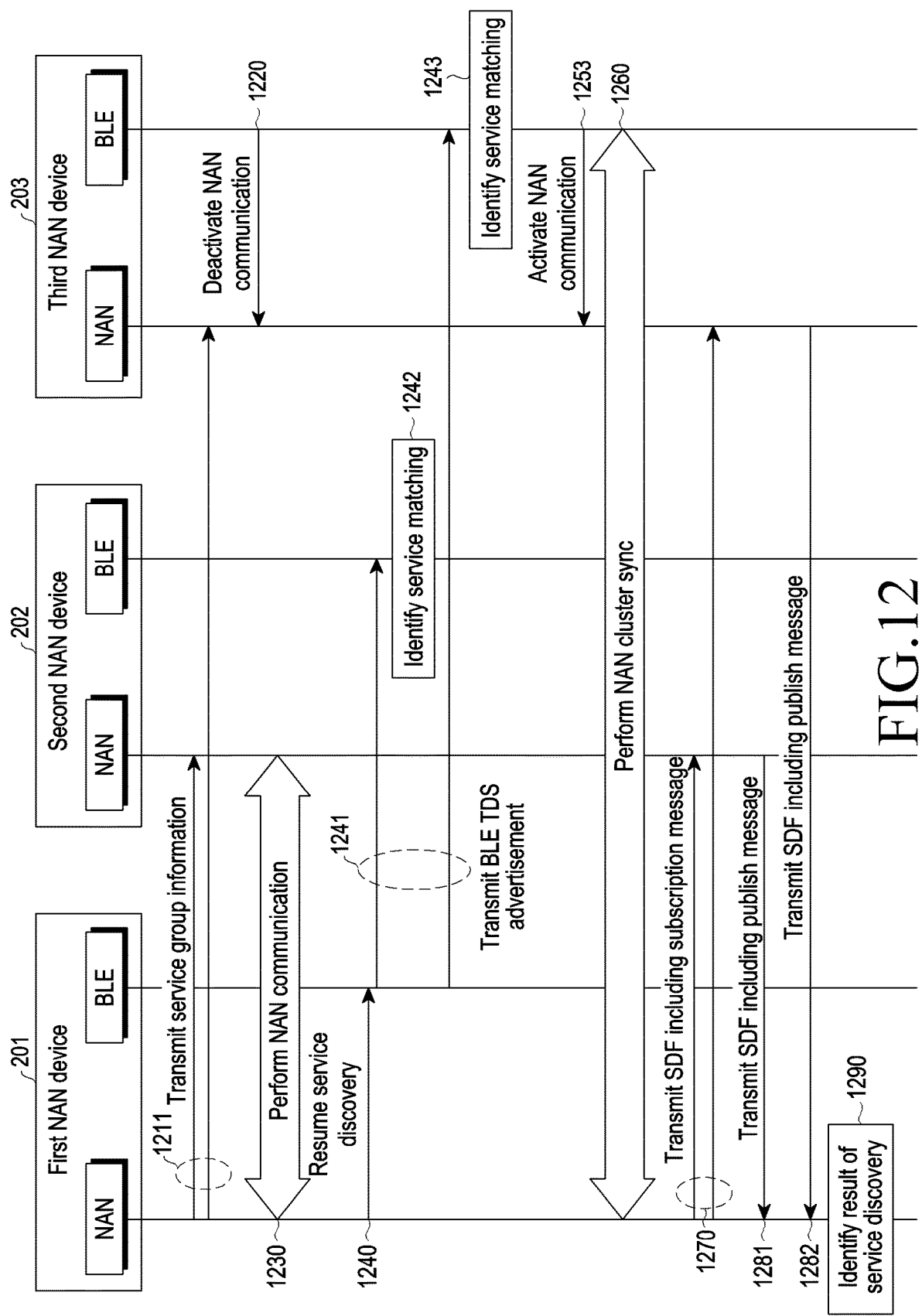
FIG. 12 is a flowchart illustrating an example of a service discovery resume operation between devices in a NAN cluster according to various embodiments of the disclosure.

FIG. 12 is a flowchart illustrating an example of a service discovery resume operation between devices in a NAN cluster according to various embodiments of the disclosure.

Referring to FIG. 12, a NAN cluster (e.g., the NAN cluster 200 of FIG. 2) may include a first NAN device 201, a second NAN device 202, and a third NAN device 203.

According to various embodiments of the disclosure, the first NAN device 201 may receive a publish message in response to a subscription message and may identify device information included in the publish message. The device information may include a device name, a device user's user name, the user's profile information, the user's phone number information, or account information.

According to various embodiments of the disclosure, the first NAN device 201 may output a list of NAN devices (e.g., 202, 203 or 204) searched based on the device information and may identify at least one device selected by the user from the output list as a service target device.

According to various embodiments of the disclosure, the first NAN device 201 may identify the service target device without outputting the list, based on information set for a specific service. For example, the first NAN device 201 may automatically select a device including account information corresponding to the account information about the first NAN device 201, as a service target device. A logic may be used to automatically select a device, which uses a family account with the first NAN device 201, as a service target device. Alternatively, in the first NAN device 201, a device stored in the contacts application of the first NAN device 201 and set as a specific relationship (e.g., family or friends) based on phone number information may be automatically selected.

In operation 1211, the first NAN device 201 may transmit service group information to the second NAN device 202 and the third NAN device 203 through NAN communication. For example, the service group information may include information about the service target device selected automatically or by the user. A separate service ID or group ID may be set for the service target device.

In operation 1220, as the third NAN device 203 identifies that the obtained service group information does not include information about the service ID or group ID set for the third NAN device 203, the third NAN device 203 may deactivate NAN communication.

In operation 1230, the first NAN device 201 may perform NAN communication with the second NAN device 202. For example, the second NAN device 202 may identify the information about the service ID or group ID set for the second NAN device 202 in the obtained service group information and maintain the active state of NAN communication in the second NAN device 202. Thus, the second NAN device 202 may perform NAN communication with the first NAN device 201.

In operation 1240, the first NAN device 201 may activate BLE communication to resume service discovery. For example, as the DW period identified through the prior NAN cluster synchronization operation arrives, the first NAN device 201 may resume service discovery.

In operation 1241, the first NAN device 201 may transmit a BLE TDS advertisement to the second NAN device 202 and the third NAN device 203 through BLE communication.

In operation 1242, the second NAN device 202 may identify that service is matched with the first NAN device 201 based on the received BLE TDS advertisement in the activated state of the BLE scan mode.

In operation 1243, the third NAN device 203 may identify that service is matched with the first NAN device 201 based on the received BLE TDS advertisement in the activated state of the BLE scan mode.

In operation 1253, the third NAN device 203 may activate NAN communication as it is identified that service is matched with the first NAN device 201.

In operation 1260, the first NAN device 201, the second NAN device 202, and the third NAN device 203 may perform cluster synchronization.

In operation 1270, the first NAN device 201 may transmit an SDF including a subscription message to the second NAN device 202 and the third NAN device 203.

In operation 1281, in response to the SDF including the subscription message, the second NAN device 202 may include a publish message in the SDF and transmit the SDF to the first NAN device 201.

In operation 1282, in response to the SDF including the subscription message, the third NAN device 203 may include a publish message in the SDF and transmit the SDF to the first NAN device 201.

In operation 1290, the first NAN device 201 may identify the result of service discovery based on the received publish message.

According to various embodiments of the disclosure, the first NAN device 201 may output the identified result of service discovery and identify a device, selected by the user as a device to perform NAN communication or selected automatically as a designated condition is met, among the devices according to the result of service discovery, as the service target device.

Figure 13:
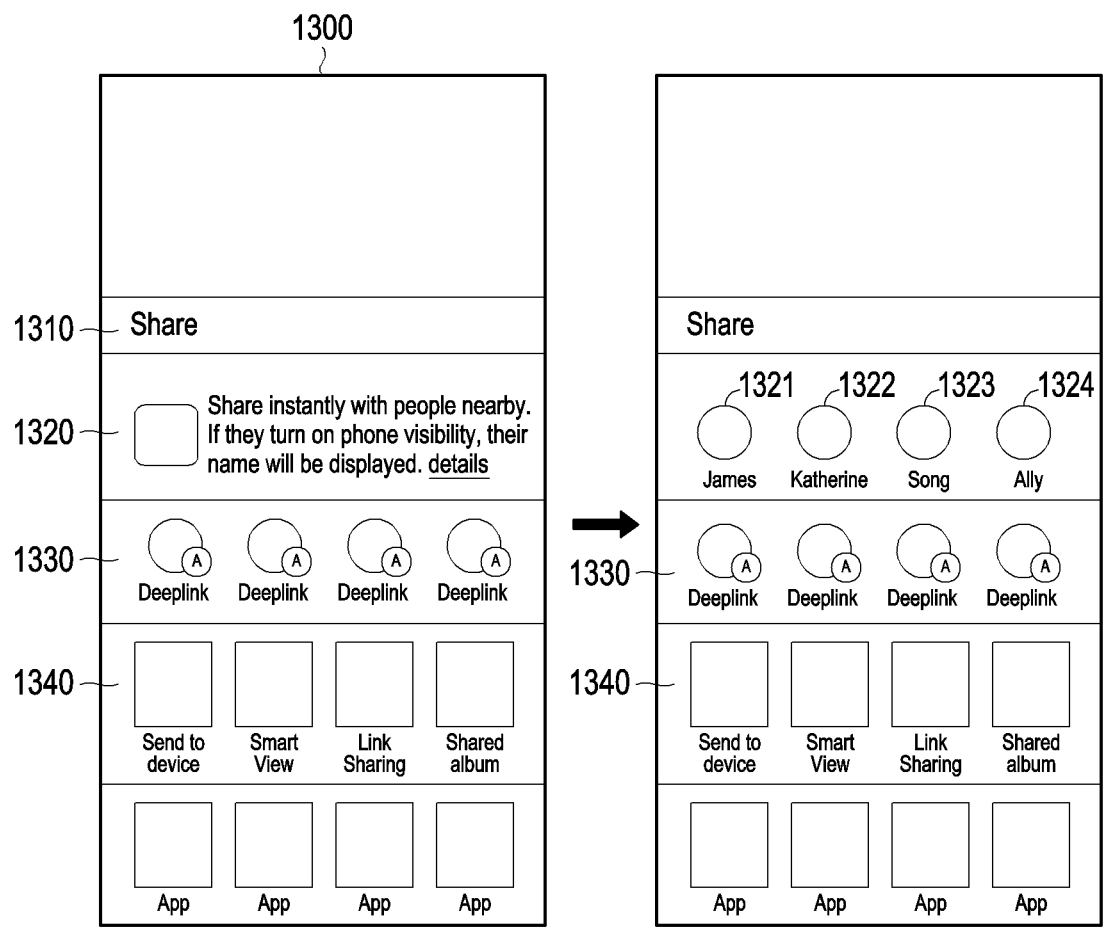
FIG. 13 is a view illustrating an example of a service discovery result screen configuration through NAN communication according to various embodiments of the disclosure.

FIG. 13 is a view illustrating an example of a service discovery result screen configuration through NAN communication according to various embodiments of the disclosure.

Referring to FIG. 13, the electronic device 500 may display a content sharing screen 1300. For example, the content sharing screen 1300 may be displayed as content to be shared is selected by the user or as a designated menu or function is executed.

According to various embodiments of the disclosure, the content sharing screen 1300 may include a screen display control button 1310, a service discovery result display area 1320, a shared link display area 1330, or a shared service selection area 1340.

According to various embodiments of the disclosure, as the user inputs a gesture input (e.g., a slide input upwards/downwards) to the screen display control button 1310, the content sharing screen 1300 may be controlled to be displayed or hidden.

According to various embodiments of the disclosure, the service discovery result display area 1320 may display at least one NAN device searched as service discovery is performed. For example, the at least one NAN device may be a peripheral device searched by exchanging NAN SDFs and may be displayed in order of distance from the electronic device 500.

According to various embodiments of the disclosure, in a case where an ambient device is set to be discoverable when the content sharing screen 1300 is displayed, a phrase indicating that the name of the ambient device is displayed ("share instantly with people nearby. If they turn on phone visibility, their name will be displayed.") may be displayed in the service discovery result display area 1320. Thereafter, as service discovery is performed, the phrase may be replaced with a list of discovered ambient devices which may then be displayed.

According to various embodiments of the disclosure, the electronic device 500 may identify 'James' 1321, 'Katherine,' 1322, 'Song,' 1323, or 'Alley' 1324, as devices supporting NAN communication by performing service discovery and display information 1321 corresponding to the identified device in the service discovery result display area 1320.

According to various embodiments of the disclosure, the shared link display area 1330 may display a list of links that may share selected content. For example, information about selected content may be transmitted through a specific link selected from the list of links.

According to various embodiments of the disclosure, the shared service selection area 1340 may include a list of services that may be executed through NAN communication. The services executable through NAN communication may include send content to device, smart view, link sharing, or shared album. For example, if one of the services is selected, a function related to the selected service may be performed on the selected content.

According to various embodiments of the disclosure, if the user selects at least one (e.g., 'James' 1321 or 'Katherine' 1322) from among the devices displayed in the service discovery result display area 1320, the electronic device 500 may transmit a service group information message including information about the selected devices to the devices displayed in the service discovery result display area 1320. For example, the selected devices may be set as separate service group ID information, and the service group ID may be included in the service group information message.

According to various embodiments of the disclosure, the electronic device receiving the service group information message may control to deactivate NAN communication if the service group information message does not include information about the electronic device 500 (e.g., devices except for 'James' 1321 or 'Katherine' 1322). For example, when the service group information message includes information about the corresponding electronic device 500, a function related to the electronic device 500 and the service selected for the content selected in the electronic device 500 may be performed.

Figure 14:
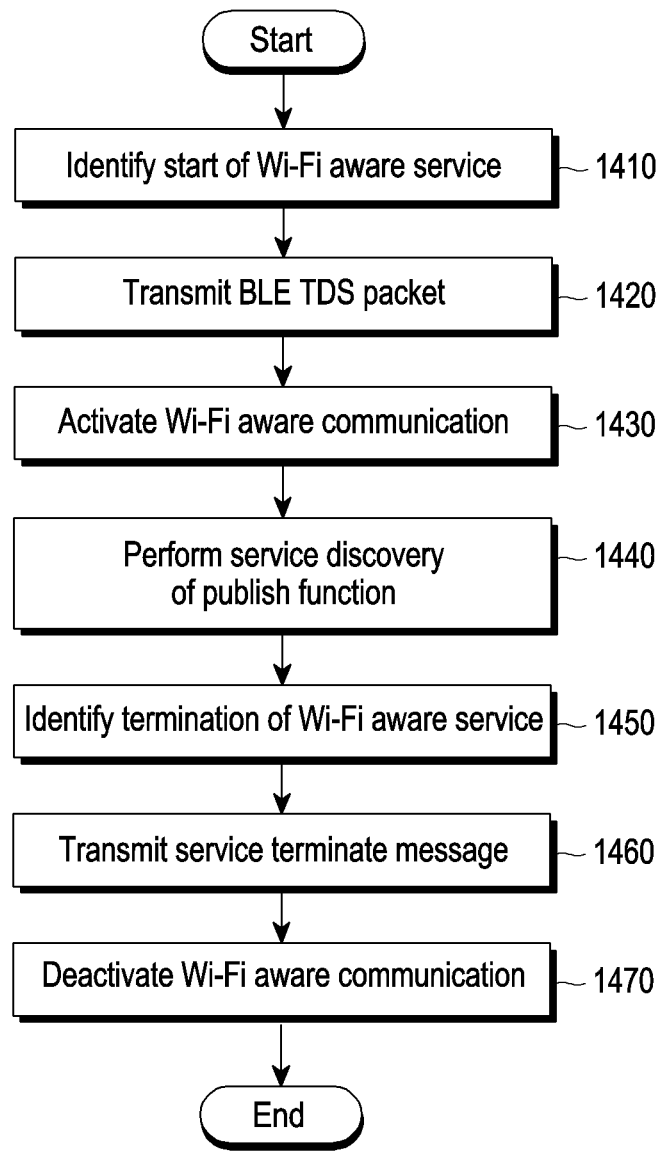
FIG. 14 is a flowchart illustrating an example of a NAN communication deactivation operation in an electronic device according to various embodiments of the disclosure.

FIG. 14 is a flowchart illustrating an example of a NAN communication deactivation operation in an electronic device according to various embodiments of the disclosure.

Referring to FIG. 14, in operation 1410, the electronic device 500 (e.g., the first NAN device 201) may identify the start of a Wi-Fi aware service. For example, as a content share request is received through NAN communication from the user, the electronic device 500 may identify that the Wi-Fi aware service is started.

In operation 1420, the electronic device 500 may transmit a BLE TDS packet. The BLE TDS packet may include service information and service group information.

In operation 1430, the electronic device 500 may activate Wi-Fi aware communication. For example, the electronic device 500 may identify that the service information of the received BLE TDS packet matches the electronic device 500 and, as the service group information includes information related to the electronic device 500, activate NAN radio to thereby activate Wi-Fi aware communication.

In operation 1440, the electronic device 500 may perform service discovery of a subscription function. For example, the electronic device 500 may transmit a subscription message to a device in the NAN cluster, performing service discovery.

In operation 1450, the electronic device 500 may identify the termination of the Wi-Fi aware service. For example, when a designated button (e.g., a back button) or menu is selected in response to the service, when a user input for the Wi-Fi aware service is not received within a designated time, or when the service is identified to be complete, the electronic device 500 may identify that the execution of the Wi-Fi aware service is terminated.

In operation 1460, the electronic device 500 may transmit a service terminate message to the devices in the NAN cluster.

In operation 1470, the electronic device 500 may deactivate Wi-Fi aware communication.

According to various embodiments of the disclosure, the NAN device receiving the service terminate message may identify that NAN communication is terminated and control to deactivate NAN communication in the corresponding device.

According to various embodiments of the disclosure, as the electronic device 500 controls to deactivate NAN communication (or Wi-Fi aware communication) based on the service terminate message, the electronic device 500 may control to prevent a BLE TDS packet from being unnecessarily transmitted even when the service is terminated.

Figure 15:
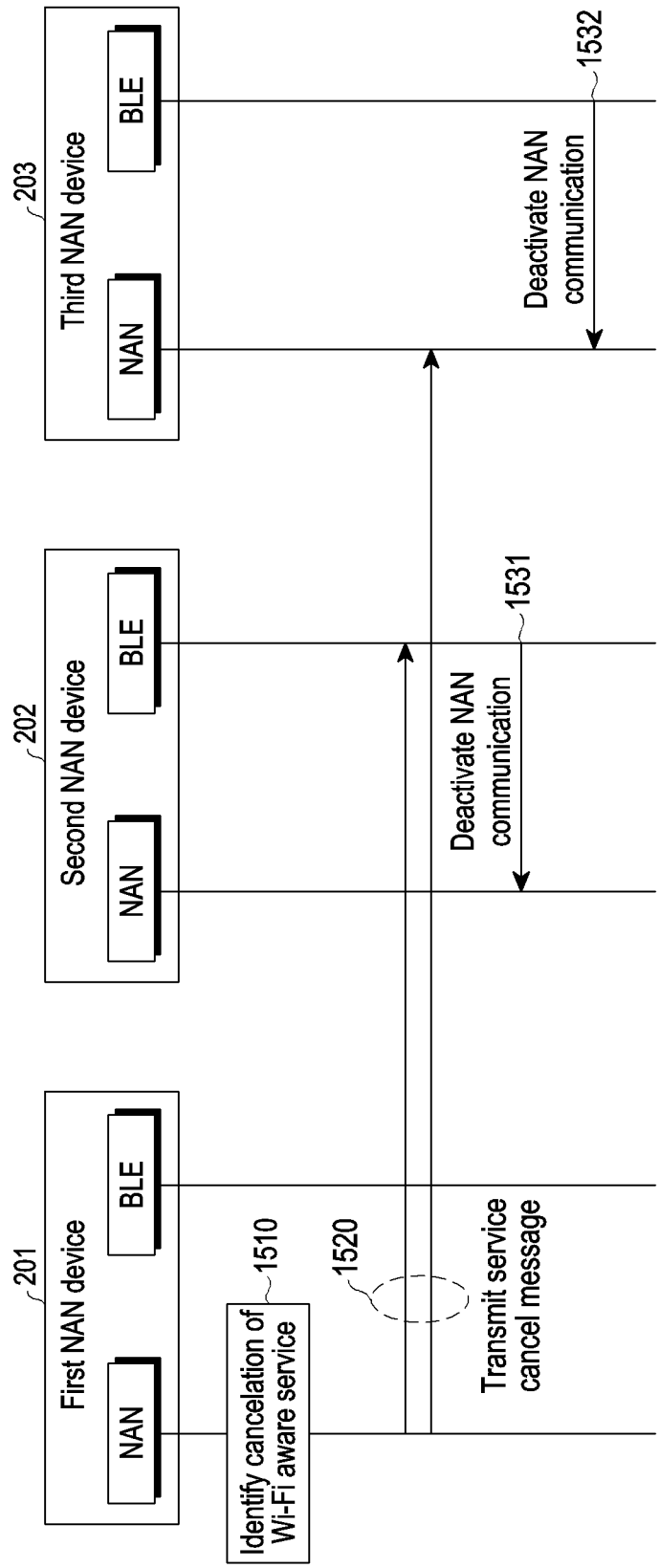
FIG. 15 is a flowchart illustrating an example of a NAN communication deactivation operation according to various embodiments of the disclosure.

FIG. 15 is a flowchart illustrating an example of a NAN communication deactivation operation according to various embodiments of the disclosure.

Referring to FIG. 15, a NAN cluster (e.g., the NAN cluster 200 of FIG. 2) may include a first NAN device 201, a second NAN device 202, and a third NAN device 203.

In operation 1510, the first NAN device 201 may identify a cancel command (or terminate command) for execution of the Wi-Fi aware service through NAN communication. For example, the first NAN device 201 may identify a predesignated input reception or button input for canceling or terminating the execution of the Wi-Fi aware service, as the cancel command (or terminate command) for the execution of the Wi-Fi aware service through NAN communication.

In operation 1520, the first NAN device 201 may transmit a service cancel (or terminate) message to the second NAN device 202 or the third NAN device 203 in the NAN cluster 200 through NAN communication. For example, the service cancel (or terminate) message may include information to indicate that the execution of the content share function through NAN communication in the first NAN device 201 is canceled (or terminated).

In operation 1531, as the second NAN device 202 receives the service cancel (or terminate) message, the second NAN device 202 may deactivate NAN radio to thereby deactivate NAN communication.

In operation 1532, as the third NAN device 203 receives a service cancel (or terminate) message, the third NAN device 203 may control to deactivate NAN radio to thereby deactivate NAN communication.

Figure 16:
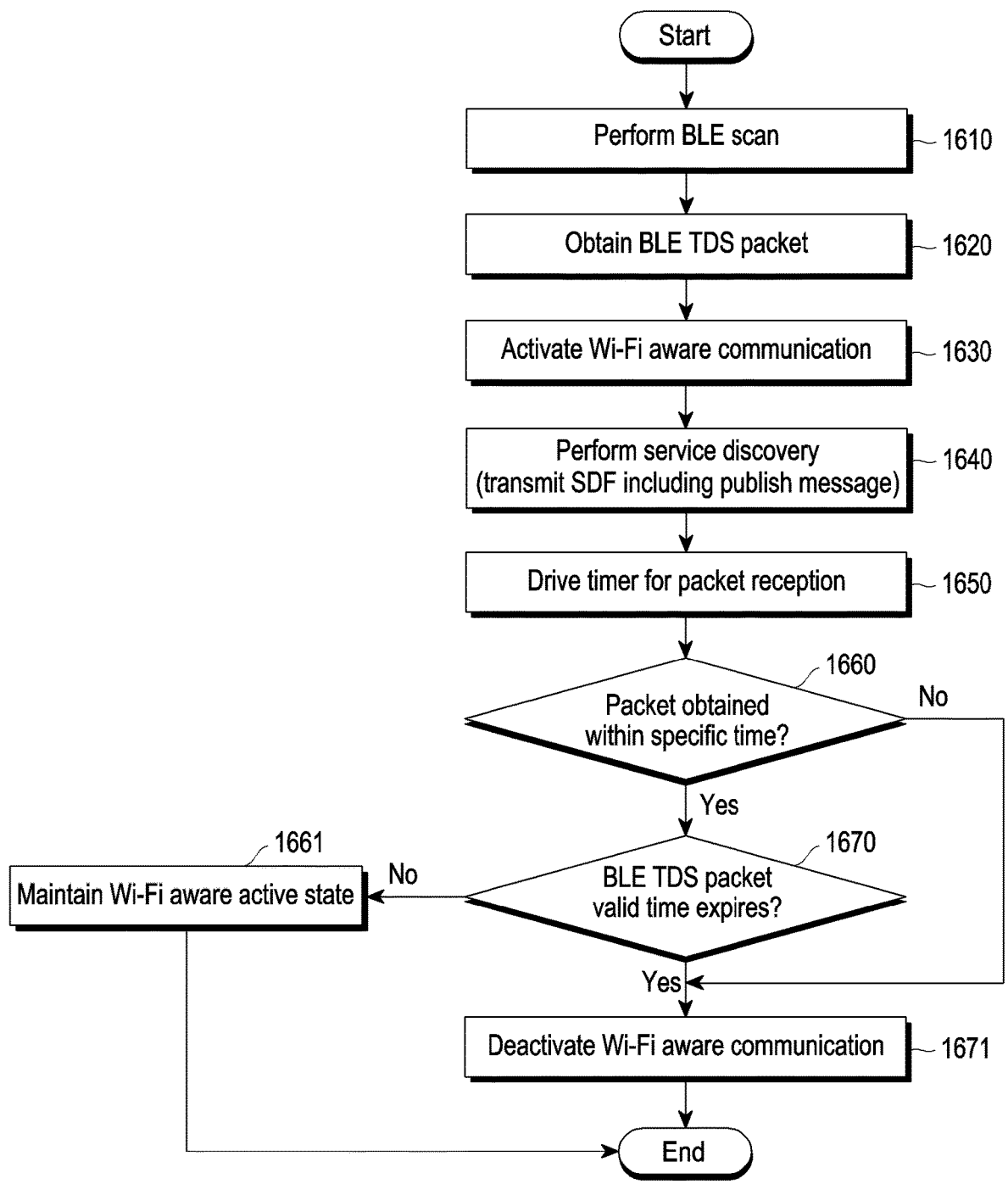
FIG. 16 is a flowchart illustrating an example of an operation of deactivating NAN communication in a NAN device according to various embodiments of the disclosure.

FIG. 16 is a flowchart illustrating an example of an operation of deactivating NAN communication in a NAN device according to various embodiments of the disclosure.

According to various embodiments of the disclosure, a NAN cluster (e.g., the NAN cluster 200 of FIG. 2) may include a first NAN device 201, a second NAN device 202, and a third NAN device 203. For example, FIG. 16 may be an operation in which the third NAN device 203 deactivates NAN communication.

Referring to FIG. 16, in operation 1610, the third NAN device 203 may perform a BLE scan.

In operation 1620, the third NAN device 203 may receive a BLE TDS packet from the first NAN device 201. For example, the BLE TDS packet may include service information about the first NAN device 201.

In operation 1630, as the third NAN device 203 identifies that it is service-matched with the first NAN device 201 based on the BLE TDS packet, the third NAN device 203 may activate the Wi-Fi aware service. For example, the third NAN device 203 may determine whether it is service-matched with the first NAN device 201 based on the service information included in the BLE TDS packet.

In operation 1640, the third NAN device 203 may perform service discovery. For example, as the third NAN device 203 receives an SDF including a subscription message from the first NAN device 201, the third NAN device 203 may transmit the SDF including a publish message in response to the subscription message, performing the service discovery.

In operation 1650, the third NAN device 203 may drive a timer for the elapsed time after the BLE TDS packet is received. For example, although operation 1650 is described as performed after operation 1640 in which service discovery is performed, operation 1650 may be performed after operation 1620 in which the BLE TDS packet is received.

In operation 1660, the third NAN device 203 may determine whether a BLE TDS packet is received within a designated time.

As a result of performing operation 1660, if a BLE TDS packet is not received within the designated time, the third NAN device 203 may deactivate Wi-Fi aware communication in operation 1671.

As a result of performing operation 1660, if a BLE TDS packet is received within the designated time, the third NAN device 203 may determine whether a valid time of the BLE TDS packet expires in operation 1670. For example, the BLE TDS packet may include valid time information. The third NAN device 203 may determine whether the received BLE TDS packet is valid by comparing the valid time information with the current time.

As a result of performing operation 1670, if the valid time of the BLE TDS packet does not expire, the third NAN device 203 may maintain the active state of the Wi-Fi aware communication in operation 1661.

As a result of performing operation 1670, if the valid time of the BLE TDS packet expires, the third NAN device 203 may deactivate Wi-Fi aware communication in operation 1671.

Figure 17:
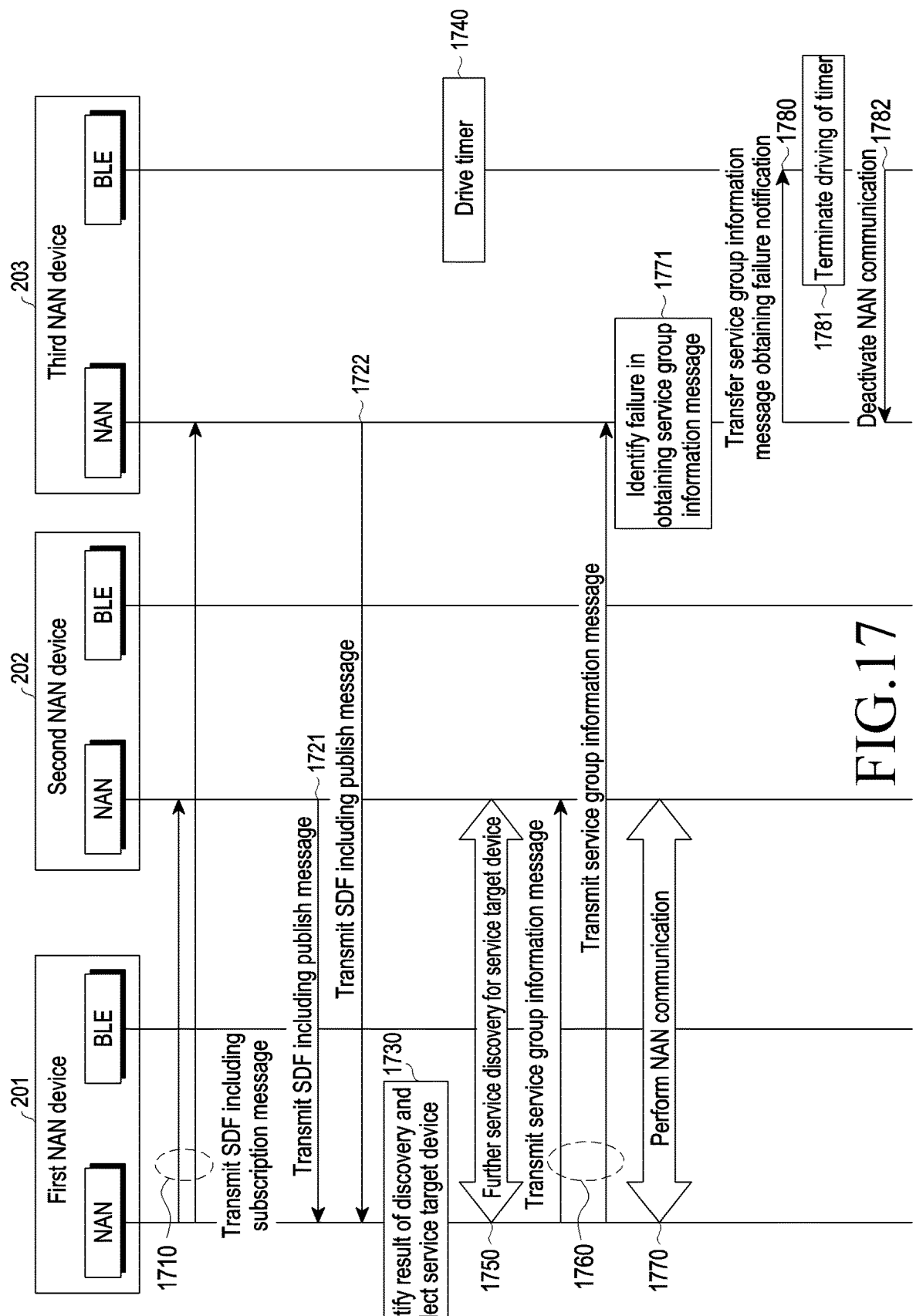
FIG. 17 is a flowchart illustrating an example of an operation of deactivating NAN communication in a NAN cluster according to various embodiments of the disclosure.

FIG. 17 is a flowchart illustrating an example of an operation of deactivating NAN communication in a NAN cluster according to various embodiments of the disclosure.

Referring to FIG. 17, a NAN cluster (e.g., the NAN cluster 200 of FIG. 2) may include a first NAN device 201, a second NAN device 202, and a third NAN device 203.

In operation 1710, the first NAN device 201 may transmit an SDF including a subscription message to the second NAN device 202 or the third NAN device 203 through NAN communication.

In operation 1721, the second NAN device 202 may transmit, to the first NAN device 201, an SDF including a publish message in response to the subscription message through NAN communication.

In operation 1722, the third NAN device 203 may transmit, to the first NAN device 201, an SDF including a publish message in response to the subscription message through NAN communication.

In operation 1730, the first NAN device 201 may identify the result of service discovery based on the received publish message and identify selection of a service target device from among the devices identified by the service discovery. For example, the devices identified by the service discovery may include electronic devices which have transmitted publish messages corresponding to the subscription message.

In operation 1740, the third NAN device 203 may drive a timer for the elapsed time after the publish message is transmitted through BLE communication. According to various embodiments of the disclosure, the second NAN device 202 may drive the timer for the elapsed time after the publish message is transmitted through BLE communication. For example, if a service group message is received from the first NAN device 201 before the timer expires, the second NAN device 202 may stop driving the timer.

In operation 1750, the first NAN device 201 may perform further service discovery on the service target device. For example, the first NAN device 201 may select the second NAN device 202 as a service target device based on the publish message received from the second NAN device 202.

In operation 1760, the first NAN device 201 may transmit a service group information message including service group information to the second NAN device 202 and the third NAN device 203 through NAN communication. For example, the service group information may include information about the device selected as a service target device, among the electronic devices searched as a result of the further service discovery.

In operation 1770, the first NAN device 201 and the second NAN device 202 receiving the service group information may perform NAN communication.

In operation 1771, the NAN communication module of the third NAN device 203 may identify that reception of the service group information message fails, if a service group information message is not received until the driven timer expires.

In operation 1780, the NAN communication module of the third NAN device 203 may transfer information indicating that reception of a service group information message fails to the BLE communication module of the third NAN device 203.

In operation 1781, the BLE communication module of the third NAN device 203 may terminate the driving of the timer as it identifies failure in receiving a service group information message.

In operation 1782, the third NAN device 203 may deactivate NAN communication.

According to an embodiment, if a service group information message is not received from the first NAN device 201 before the timer driven in operation 1740 expires, the third NAN device 203 may determine that the third NAN device 203 is not selected as a service target device of NAN communication and may deactivate NAN communication.

According to various embodiments of the disclosure, a service group information message may be transmitted from the first NAN device 201 to the third NAN device 203 as operation 1760 is performed, and the third NAN device 203 may receive the service group information message within a predetermined time. For example, if it is identified that information related to the third NAN device 203 is not included in the received service group information message, the BLE communication module of the third NAN device 203 may control to request the NAN communication module of the third NAN device 203 to deactivate NAN communication in operation 1782. For example, the third NAN device 203 may control to terminate the timer driven in operation 1740 and deactivate NAN communication.

Figure 18:
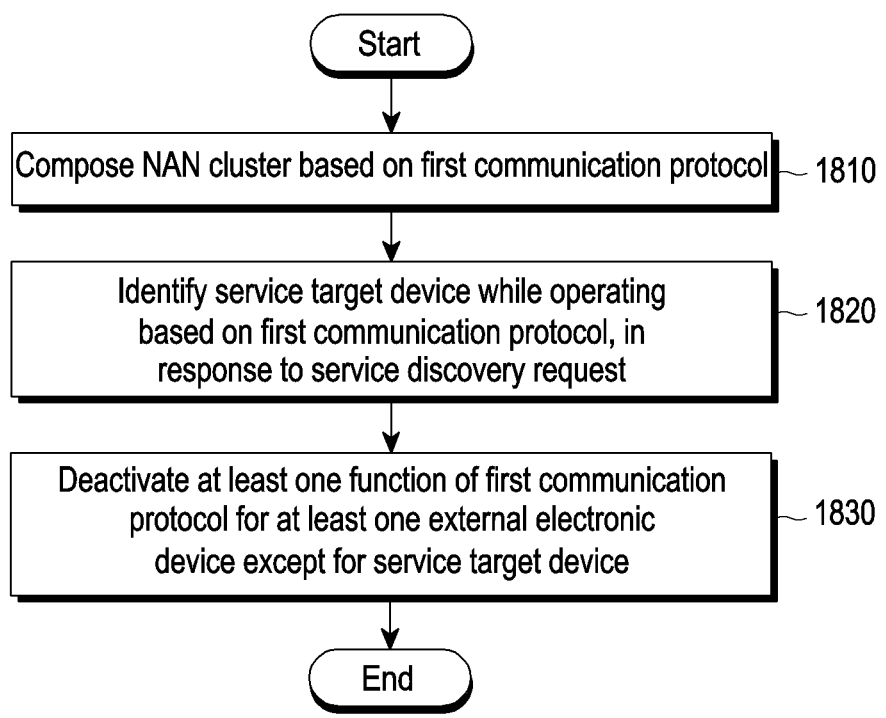
FIG. 18 is a flowchart illustrating an example of an operation of deactivating NAN communication in a NAN device according to various embodiments of the disclosure.

FIG. 18 is a flowchart illustrating an example of an operation of deactivating NAN communication in a NAN device according to various embodiments of the disclosure.

Referring to FIG. 18, in operation 1810, the electronic device 500 (or the first NAN device 201) may compose a NAN cluster 200 communicating with a plurality of external electronic devices based on a first communication protocol.

In operation 1820, the electronic device 500 may identify a service target device among the plurality of external electronic devices while operating with the plurality of external electronic devices based on the first communication protocol (e.g., NAN communication mode) in response to a service discovery request.

According to various embodiments of the disclosure, the electronic device 500 may perform service discovery to discover the plurality of external electronic devices according to the service discovery request. For example, the service target device may include a device selected by the user or at least one device selected automatically according to a predesignated condition from among devices identified according to the result of service discovery.

According to various embodiments of the disclosure, a service discovery method in an electronic device may further include transmitting, to the plurality of external electronic devices, a service group information message including the service target device as the service target device is identified.

According to various embodiments of the disclosure, the service discovery method may further include outputting information about the plurality of external electronic devices and transmitting the service group information message based on identifying the user's selection input for the service target device among the plurality of external electronic devices output.

In operation 1830, the electronic device 500 may control at least one external electronic device, except for the service target device among the plurality of external electronic devices, to deactivate at least one function related to the first communication protocol.

According to various embodiments of the disclosure, the service discovery method in the electronic device may further include transmitting, to the plurality of external electronic devices, a service cancel message to deactivate at least one function related to the first communication protocol when an execution cancel input for content sharing is identified. For example, the execution cancel input for the content sharing may include a specific button input or a specific user input.

According to various embodiments of the disclosure, the service discovery method in the electronic device may further include performing service discovery based on a second communication protocol operating with lower power than the first communication protocol while the at least one function related to the first communication protocol is inactive. For example, the first communication protocol may be a NAN communication protocol, and the second communication protocol may be a BLE communication protocol.

According to various embodiments of the disclosure, a method for performing service discovery in an electronic device (e.g., the electronic device 104, the second NAN device 202, or the third NAN device 203) may comprise configuring a neighbor awareness network (NAN) cluster communicating with a first electronic device (e.g., the electronic device 101 or 500 or the first NAN device 201) based on a first communication protocol, transmitting a service discovery request to the first electronic device, receiving service group information from the first electronic device, according to the transmission of the service discovery request, identifying whether the service group information includes information about the electronic device, and deactivating at least one function related to the first communication protocol if it is identified that the service group information does not include the information about the electronic device.

According to various embodiments of the disclosure, the service discovery method in the electronic device may further comprise identifying a time from the transmission of the service discovery request to reception of the service group information and controlling to deactivate the at least one function related to the first communication protocol as the identified time exceeds a specific value.

According to various embodiments of the disclosure, the service discovery method in the electronic device may further comprise receiving a service cancel message from the first electronic device and controlling to deactivate the at least one function related to the first communication protocol according to the reception of the service cancel message.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one communication module;
   a processor operatively connected with the at least one communication module; and
   a memory operatively connected with the at least one communication module and the processor;
   wherein the memory stores instructions configured to, when executed, enable the electronic device to:
      configure, based on a first communication protocol, through the at least one communication module, a neighbor awareness network (NAN) cluster including the electronic device and a plurality of external electronic devices,
      identify, based on configuring the NAN cluster, a service target device among the plurality of external electronic devices, while operating with the plurality of external electronic devices based on the first communication protocol, and
      control, based on identifying the service target device, by transmitting a service group information message through the at least one communication module, at least one external electronic device except for the service target device among the plurality of external electronic devices, to deactivate at least one active function related to the first communication protocol.

2. The electronic device of claim 1, wherein the instructions are further configured to enable the electronic device to control the at least one communication module to transmit, based on identifying the service target device, to the plurality of external electronic devices, the service group information message including information related to the service target device.

3. The electronic device of claim 2, further comprising a display device,
   wherein the instructions are further configured to enable the electronic device to:
      control the display device to output information about the plurality of external electronic devices, and
      control the at least one communication module to transmit the service group information message based on identifying a user's selection input for the service target device among the plurality of external electronic devices through the display device.

4. The electronic device of claim 1, wherein the instructions are further configured to enable the electronic device to, when an execution cancel input for content sharing is identified, control the at least one communication module to transmit, to the plurality of external electronic devices, a service cancel message to deactivate at least one active function related to the first communication protocol.

5. The electronic device of claim 4, wherein the execution cancel input for content sharing includes a specific button input or a specific user input.

6. The electronic device of claim 1, wherein the instructions are further configured to enable the electronic device to control the at least one communication module to perform a service discovery based on a second communication protocol operating with lower power than the first communication protocol while at least one function related to the first communication protocol is inactive.

7. The electronic device of claim 6,
wherein the first communication protocol is a NAN communication protocol, and
wherein the second communication protocol is a Bluetooth low energy (BLE) communication protocol.

8. An electronic device comprising:
at least one communication module;
a processor operatively connected with the at least one communication module; and
a memory operatively connected with the at least one communication module and the processor,
wherein the memory stores instructions configured to, when executed, enable the electronic device to:
configure, based on a first communication protocol, through the at least one communication module, a neighbor awareness network (NAN) cluster including the electronic device and a first electronic device,
control, based on configuring the NAN cluster, the at least one communication module to transmit a service discovery request to the first electronic device,
obtain, based on the transmission of the service discovery request, service group information from the first electronic device,
identify whether the service group information includes information about the electronic device, and
control the at least one communication module to deactivate, when it is identified that the service group information does not include the information about the electronic device, at least one function related to the first communication protocol.

9. The electronic device of claim 8, wherein the instructions are further configured to enable the electronic device to:
identify a time from the transmission of the service discovery request to obtaining of the service group information, and
control the at least one communication module to deactivate the at least one function related to the first communication protocol as the identified time exceeds a specific value.

10. The electronic device of claim 8, wherein the instructions are further configured to enable the electronic device to:
obtain a service cancel message from the first electronic device through the at least one communication module, and
control the at least one communication module to deactivate the at least one function related to the first communication protocol, based on the obtaining of the service cancel message.

11. A method for performing service discovery in an electronic device, the method comprising:
configuring, based on a first communication protocol, a neighbor awareness network (NAN) cluster including the electronic device and a plurality of external electronic devices;
identifying, based on configuring the NAN cluster, a service target device among the plurality of external electronic devices, while operating with the plurality of external electronic devices based on the first communication protocol; and
controlling, based on identifying the service target device, by transmitting a service group information message, at least one external electronic devices, except for the service target device among the plurality of external electronic devices, to deactivate at least one active function related to the first communication protocol.

12. The method of claim 11, further comprising transmitting, based on identifying the service target device, to the plurality of external electronic devices, the service group information message including information related to the service target device.

13. The method of claim 12, further comprising:
outputting information about the plurality of external electronic devices; and
transmitting the service group information message, based on identifying a user's selection input for the service target device among the plurality of external electronic devices.

14. The method of claim 11, further comprising, when an execution cancel input for content sharing is identified, transmitting, to the plurality of external electronic devices, a service cancel message to deactivate at least one active function related to the first communication protocol.

15. The method of claim 14, wherein the execution cancel input for content sharing includes a specific button input or a specific user input.

16. The method of claim 11, further comprising controlling to perform the service discovery based on a second communication protocol operating with lower power than the first communication protocol while at least one function related to the first communication protocol is inactive.

17. The method of claim 16,
wherein the first communication protocol is a NAN communication protocol, and
wherein the second communication protocol is a Bluetooth low energy (BLE) communication protocol.

18. A method for performing service discovery in an electronic device, the method comprising:
configuring, based on a first communication protocol, a neighbor awareness network (NAN) cluster including the electronic device and a first electronic device;
transmitting, based on configuring the NAN cluster, a service discovery request to the first electronic device;
obtaining, based on the transmission of the service discovery request, service group information from the first electronic device;
identifying whether the service group information includes information about the electronic device; and
deactivating, when it is identified that the service group information does not include the information about the electronic device, at least one function related to the first communication protocol.

19. The method of claim 18, further comprising:
identifying a time from the transmission of the service discovery request to obtaining of the service group information; and controlling to deactivate the at least one function related to the first communication protocol as the identified time exceeds a specific value.

20. The method of claim 18, further comprising:

obtaining a service cancel message from the first electronic device; and controlling to deactivate the at least one function related to the first communication protocol based on the obtaining of the service cancel message.

* * * * *